United States Patent
Franzblau

(10) Patent No.: US 9,082,311 B2
(45) Date of Patent: *Jul. 14, 2015

(54) COMPUTER AIDED SYSTEM FOR TEACHING READING

(71) Applicant: Electronic Learning Products, Inc., Tampa, FL (US)

(72) Inventor: Charles A. Franzblau, Tampa, FL (US)

(73) Assignee: ELECTRONIC LEARNING PRODUCTS, INC., Tampa, FL (US)

(*) Notice: Subject to any disclaimer, the term of this patent is extended or adjusted under 35 U.S.C. 154(b) by 6 days.

This patent is subject to a terminal disclaimer.

(21) Appl. No.: 13/657,447

(22) Filed: Oct. 22, 2012

(65) Prior Publication Data

US 2013/0171591 A1 Jul. 4, 2013

Related U.S. Application Data

(63) Continuation of application No. 12/724,241, filed on Mar. 15, 2010, now Pat. No. 8,294,016, which is a continuation of application No. 11/835,062, filed on Aug. 7, 2007, now abandoned, which is a continuation-in-part of application No. 11/137,025, filed on May 25, 2005, now Pat. No. 7,271,329.

(60) Provisional application No. 60/576,233, filed on May 28, 2004.

(51) Int. Cl.
| | | |
|---|---|---|
| G04B 13/00 | (2006.01) | |
| G09B 17/00 | (2006.01) | |
| G09B 5/02 | (2006.01) | |
| G09B 15/02 | (2006.01) | |

(52) U.S. Cl.
CPC *G09B 17/00* (2013.01); *G09B 5/02* (2013.01); *G09B 15/023* (2013.01)

(58) Field of Classification Search
CPC ............ A63F 2300/8047; G10H 2210/066; G10H 2210/091; G10H 2220/015; G10H 2220/145; G10H 3/125; G10H 2220/011; G10H 2240/141; G10H 2210/031; G10L 25/90; G10L 21/013; G10L 17/14; G09B 15/00; G06K 9/00147

See application file for complete search history.

(56) References Cited

U.S. PATENT DOCUMENTS

| | | | | |
|---|---|---|---|---|
| 5,889,224 | A * | 3/1999 | Tanaka | 84/645 |
| 7,164,076 | B2 * | 1/2007 | McHale et al. | 84/616 |
| 7,806,759 | B2 * | 10/2010 | McHale et al. | 463/7 |
| 7,923,620 | B2 * | 4/2011 | Foster | 84/477 R |
| 7,935,880 | B2 * | 5/2011 | Stoddard et al. | 84/609 |
| 8,017,854 | B2 * | 9/2011 | Foster et al. | 84/616 |
| 8,465,366 | B2 * | 6/2013 | Applewhite et al. | 463/36 |

(Continued)

OTHER PUBLICATIONS

Vimas of Kiev, Singing Tutor.

(Continued)

*Primary Examiner* — Marlon Fletcher

(57) ABSTRACT

A method of teaching reading includes displaying, by an application executing on a computing device, a singing exercise configured to allow a user to sing along as a song is played. Lyrics of the song are displayed as the song plays, thus allowing the user to read the lyrics as the user sings along to the song. An audio input is monitored as the song is played. A score representing how accurately the audio input matches the song is calculated. The score is provided to the user. The method calculates the user's vocal range and uses that vocal range in generating a score.

1 Claim, 26 Drawing Sheets

(56) References Cited

U.S. PATENT DOCUMENTS

| | | | |
|---|---|---|---|
| 8,634,759 B2* | 1/2014 | Bates et al. | 434/307 A |
| 2005/0252362 A1* | 11/2005 | McHale et al. | 84/616 |
| 2005/0255914 A1* | 11/2005 | McHale et al. | 463/31 |
| 2006/0009979 A1* | 1/2006 | McHale et al. | 704/270 |
| 2009/0038467 A1* | 2/2009 | Brennan | 84/609 |
| 2009/0038468 A1* | 2/2009 | Brennan | 84/609 |
| 2009/0314154 A1* | 12/2009 | Esaki et al. | 84/611 |
| 2010/0192752 A1* | 8/2010 | Bright et al. | 84/610 |
| 2010/0255827 A1* | 10/2010 | Jordan et al. | 455/414.1 |
| 2010/0300264 A1* | 12/2010 | Foster | 84/610 |
| 2010/0300265 A1* | 12/2010 | Foster et al. | 84/610 |
| 2010/0300266 A1* | 12/2010 | Stoddard et al. | 84/610 |
| 2010/0300267 A1* | 12/2010 | Stoddard et al. | 84/610 |
| 2010/0300268 A1* | 12/2010 | Applewhite et al. | 84/610 |
| 2010/0300269 A1* | 12/2010 | Applewhite | 84/610 |
| 2010/0300270 A1* | 12/2010 | Applewhite et al. | 84/610 |
| 2010/0304810 A1* | 12/2010 | Stoddard | 463/7 |
| 2010/0304863 A1* | 12/2010 | Applewhite et al. | 463/36 |
| 2011/0003638 A1* | 1/2011 | Lee et al. | 463/35 |
| 2011/0036231 A1* | 2/2011 | Nakadai et al. | 84/477 R |
| 2011/0146478 A1* | 6/2011 | Andrews et al. | 84/611 |
| 2011/0257771 A1* | 10/2011 | Bennett et al. | 700/92 |
| 2011/0319160 A1* | 12/2011 | Arn et al. | 463/30 |
| 2012/0165086 A1* | 6/2012 | Bright et al. | 463/7 |
| 2013/0000466 A1* | 1/2013 | Taub et al. | 84/609 |
| 2013/0061735 A1* | 3/2013 | Gehring et al. | 84/622 |
| 2013/0177885 A1* | 7/2013 | Kirkpatrick | 434/247 |

OTHER PUBLICATIONS

Konami, Karaoke Revolution.

* cited by examiner

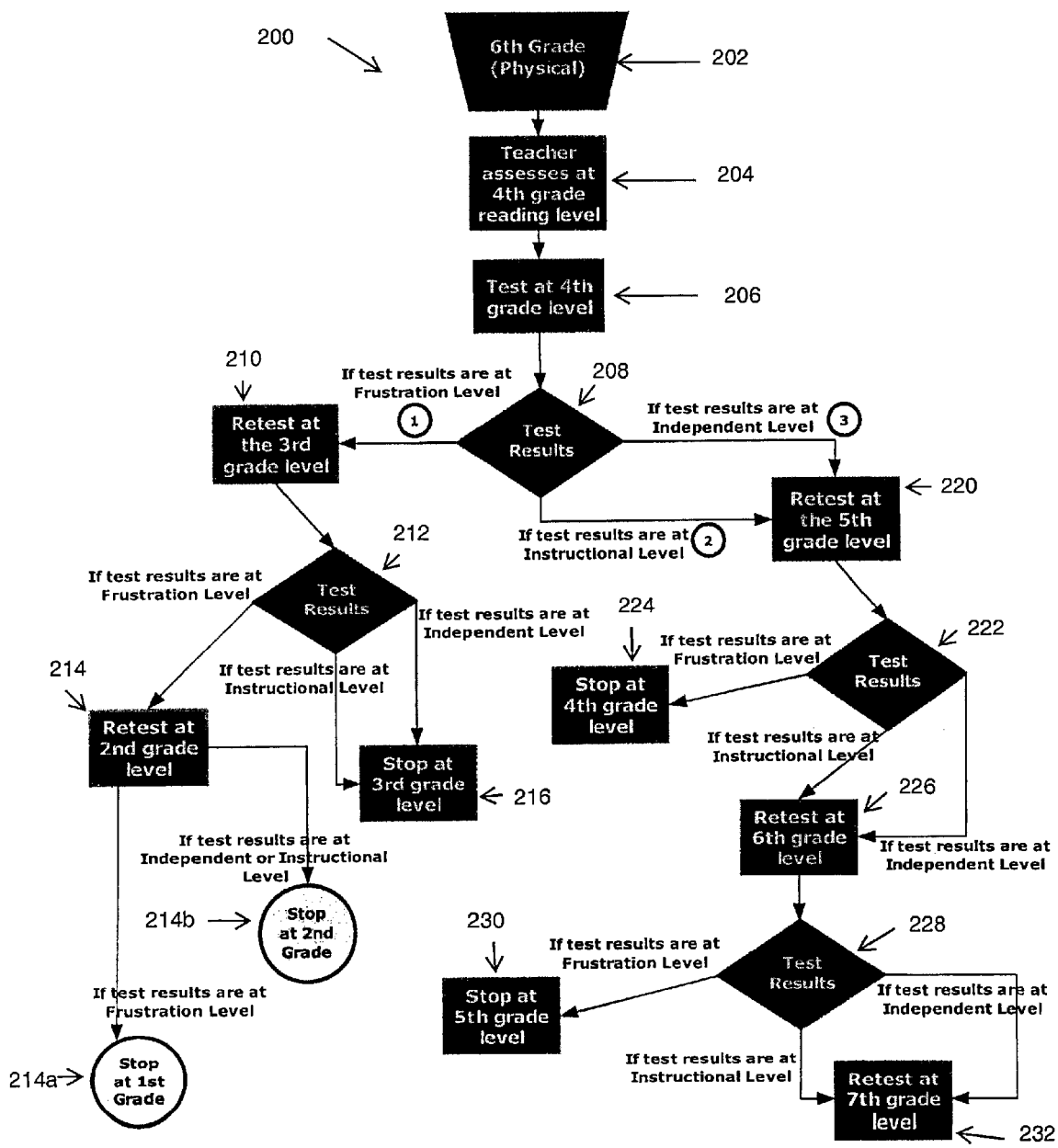

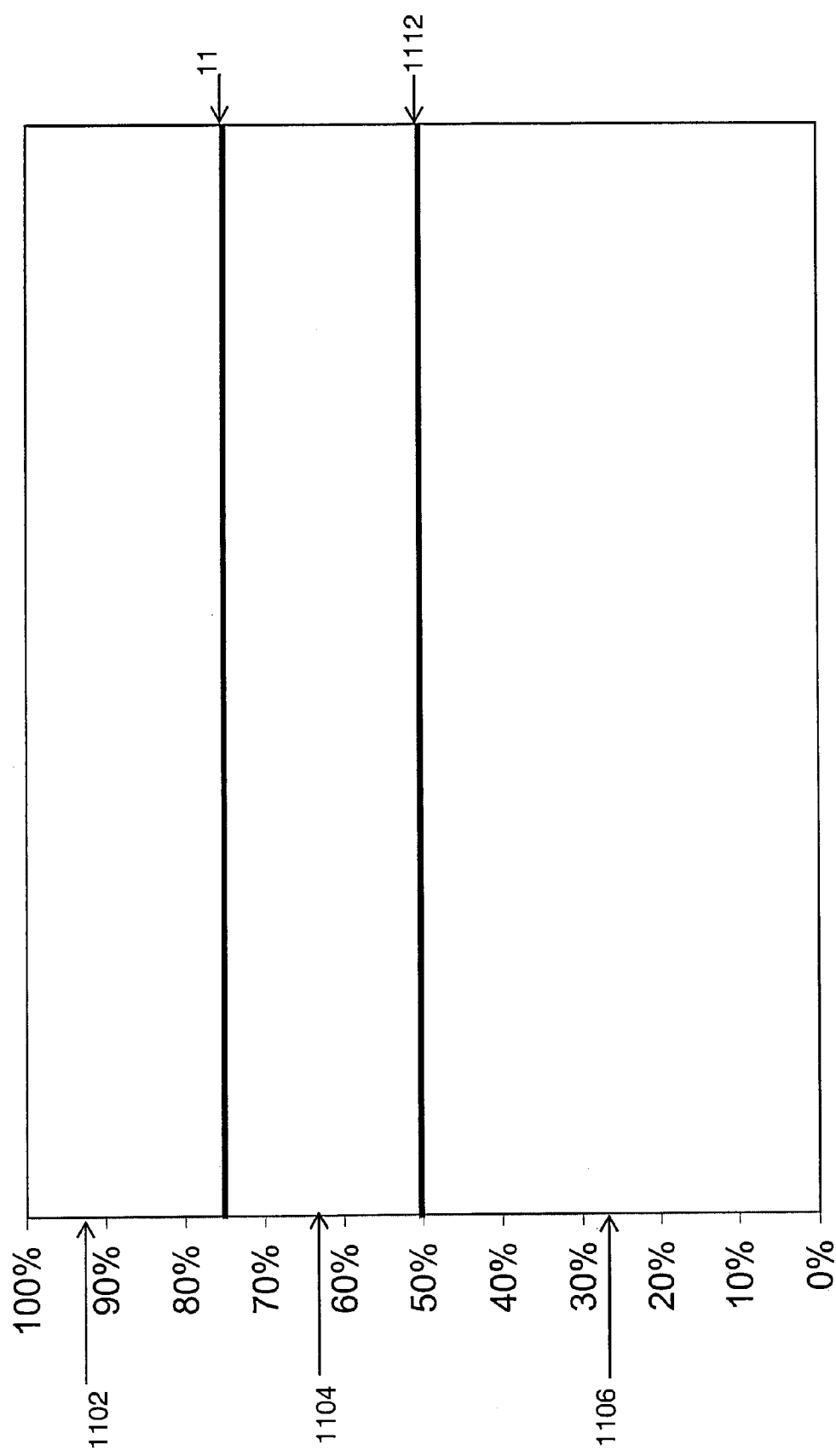

COMPUTER AIDED SYSTEM FOR TEACHING READING

CROSS-REFERENCE TO RELATED INVENTIONS

This is a continuation application under 37 C.F.R. §1.53(d) of patent application Ser. No. 12/724,241 which will issue as U.S. Pat. No. 8,294,016 on Oct. 23, 2012, which is a continuation of Ser. No. 11/853,062, filed Sep. 11, 2007, which is a continuation-in-part of Ser. No. 11/137,025, filed May 25, 2005 (now issued as U.S. Pat. No. 7,271,329), which claims priority to provisional application 60/576,233, filed May 28, 2004. All of the above-referenced disclosures are incorporated herein by reference in their entireties.

BACKGROUND OF THE INVENTION

Field of the Invention

This invention relates to computer-aided learning systems for facilitating the annunciation of human voice. More particularly, this invention relates to computer-aided learning systems that facilitate vocalizations such as singing and/or reading.

Presently, there exist many systems for teaching a person how to sing in tune and on beat. Commonly, the prior art systems focus more on the technology employed than the visual presentation to the singer. Accordingly, without an appropriate visual interface for the singer, the prior art systems are of nominal benefit to teaching the singer how to sing in tune and on beat. Representative patents of such prior art systems are disclosed below.

U.S. Pat. No. 5,208,413 entitled "Vocal Display Device" discloses a karaoke device that displays the strength of the singer's voice on a display screen. However, this patent fails to disclose a meaningful visual representation of whether the singer is singing in tune.

U.S. Pat. No. 4,546,687 discloses a "Musical Performance System" in which the vocal signal of the singer and the musical signal of a musical instrument are recorded on separate tracks and then compared, the result of which is displayed via a LED display to indicate the results of such comparison.

U.S. Pat. No. 5,287,789 discloses a "Music Training Apparatus" including one or more tone sources that are displayed as fixed-sized "bars" on a display and the singer's voice is displayed in the form of a pitch tracking line.

U.S. Pat. Nos. 5,525,062 and 5,906,494 disclose a "Training Apparatus for Singing" in which the singer's vocal characteristics are compared with a model vocal characteristic to evaluate the singer's vocal characteristics relative to the model. The result of a comparison of tune error is displayed in the form of color-coded musical notes.

U.S. Pat. No. 5,876,213 discloses a karaoke teaching apparatus that analyzes a singing voice to detect a musical register thereof at which the live vocal part is actually performed.

U.S. Pat. No. 6,417,435 discloses an audio-acoustic proficiency testing device that transduces, captures, measures, compares, analyzes, records and then reports on a singer's performance.

U.S. Pat. No. 6,617,503 discloses a vocal training device including playback modes of melody only, harmony only, melody and harmony and a multi-unit playback of melody, harmony and harmony components.

U.S. Pat. No. 6,725,108 discloses a system and method for interpretation and visualization of acoustic spectra to discover the pitch and timbre of musical sounds via display of a pitch tracking line.

Finally, U.S. Pat. No. 4,024,789 discloses a tone analysis system with a visual display in the form of sheet music containing a musical staff and lighted musical notes.

The disclosure of each of the above-listed patents is hereby incorporated by reference herein.

Commercial prior art systems include .™."Sing & See" produced by Cantare Systems of Surry Hills, Australia. In the .™."Sing & See" system, a pitch tracking line is displayed on a computer screen as the singer sings. Another commercialized implementation includes .™."Singing Tutor" published by Vimas of Kiev, Ukraine that displays a pitch tracking line on a computer screen in real time as the singer sings. Still another includes .™."Sing" formerly published by now-defunct Music Player as well as .™. "Karaoke Revolution" and "Audio Mirror" produced by Konami of Tokyo, Japan and ECS Media of Champaign, Ill., respectively. However, .™."Sing", .™."Karaoke Revolution" and .™."Audio Mirror" systems do not display a real time tracking line. For example, in the case of .™."Karaoke Revolution", a visual representation of "pitch tubes" are "lit up" when the singer sings each note in tune, but it does not employ a real time pitch tracking line.

It should be appreciated from the foregoing that the prior art systems teach in general the use of a real time tracking line. However, none of the prior art systems visually quantifies the accuracy of a singer singing in tune or out-of-tune in a manner that teaches the singer how much to raise or lower the tone of their voice as the song is being sung. Accordingly, presently there exists a need for a computer-aided learning system that employs a pitch tracking line and displays it in a way that a singer may, in real time, adjust upwardly or downwardly the tone of their voice while singing.

Therefore, it is an object of this invention to provide an improvement which overcomes the aforementioned inadequacies of the prior art devices and provides an improvement which is a significant contribution to the advancement of the computer-aided learning systems.

Another object of this invention is to provide a computer-aided learning system employing a pitch tracking line enclosed within target pitch boxes to visually quantify singing in tune and in rhythm.

Another object of this invention is to provide a computer-aided learning system employing target pitch boxes that are reduced in size depending on the desired ease in learning how to sing each note in tune.

Another object of this invention is to provide a computer-aided learning system employing a pitch tracking line and target pitch boxes that may be reduced in length to allow a singer to more easily transition from one note to another.

Another object of this invention is to provide a computer-aided learning system employing a pitch tracking line that determines a singer's comfortable vocal range and transposes the key of a prearranged song accordingly.

Another object of this invention is to provide a computer-aided learning system employing a pitch tracking line that determines a singer's comfortable vocal range and increases or decreases the key of a prearranged song by one or more octaves.

Another object of this invention is to provide a computer-aided learning system employing a pitch tracking line that includes a scoring system for numerically quantifying how accurately a singer sang in tune and rhythm.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a For the purpose of summarizing this invention, this invention comprises a computer-aided learning system to facilitate a human to control the pitch of their voice such as in singing a song. The invention further facilitates a human to control the rhythm of their voice. Accordingly, the software of the invention teaches one to "sing in tune" and "in rhythm".

The invention includes numerous features that act like "training wheels" for the person who has difficulty carrying a tune. A primary feature is a visual, real-time depiction of the user's actual pitch compared to the "target" pitch they should be singing. The invention further includes a scoring system for measuring and logging improvements in the user's ability to control his pitch.

More particularly, the invention comprises a visual depiction of pitch called the pitch tracking line ("PTL") that shows in real-time the actual pitch the user is singing. Two views of the music are provided; a Graphic View and a Sheet Music View.

The Graphic View is a "Sing Window" and is similar to an abscissa/ordinate or "X/Y" graph. The abscissa X represents time and the ordinate Y-axis represents pitch. Each pitch of each note is shown as a target pitch line to indicate the precise pitch a user should sing. A box is drawn about each target pitch line above and below the target pitch line. The height of the target pitch boxes gives the user a "margin" for error such as plus or minus ½ step (beginner level), plus or minus ¼ step (intermediate level), and plus or minus ⅛ step (advanced level). The lyrics are preferably displayed below the target pitch box. The target pitch line is preferably a colored line (e.g., a red line) and the target pitch box is a preferably a colored box such as light blue.

In the Sheet Music View, the "target pitches" are the note heads and the screen mimics a piece of sheet music complete with staves, notes, rests, key signature, etc.

The invention further comprises a custom vocal range feature that allows a user to set their personal vocal range. The user sings first up and then down. The distance between the high and low pitch tracking lines is then used to establish the top and bottom of the user's vocal range. Once the range is set, it is preferably depicted graphically in the Sing Window by colored horizontal (e.g., green) lines. Each song and exercise is automatically transposed into a key that makes the song easy for the user to sing.

The invention still further includes a scoring feature that indicates what percentage of time the pitch tracking line was within the target pitch boxes, thereby being indicative of the time the song was sung "in tune". In addition to making the margin for error larger or smaller by making the target pitch boxes higher, boxes may be made narrower to define the transition times at the beginning or end of each note during which the user is not scored. This teaches singers to sing on beat (i.e., in rhythm) and to be on pitch at the beginning of each note as they get better.

The invention further includes a tempo change feature that allows slowing the tempo of more difficult songs (without changing the key) which will allow the user to more easily learn to sing the song. After he learns to sing it, the tempo can be returned to normal.

The invention further includes breathing indicators. Specifically, in the graphic view, the spots where the user should breathe are indicated with a "B" symbol. This insures that the user has enough breath to get through each phrase on pitch.

Finally, from "pitch-matching" to "a cappella", the invention allows the user to begin learning a song with only the melody and metronome playing (he turns off the accompaniment). In this way the user may focus on matching the pitch of the melody and the proper rhythm only. Once the user can get a good score in this operating mode, the user can add the accompaniment. When that mode is mastered, the user can mute the melody and sing only with accompaniment and metronome. Upon mastering the accompaniment and metronome, the user can mute the accompaniment (and metronome if desired) and sing "a cappella" which means without the support of any audible musical reference points.

Throughout the disclosure herein, we use a simple usage of the word "Tone" as used in the instruction of tonal languages. In this arena, linguists and instructors of tonal languages use the word "Tone" to refer to what is actually the variation in "pitch" the listener hears when a given word is pronounced. For example, Mandarin is a tonal language because every word has, along with its phonetic pronunciation, one of four tones. These four tones are flat, rising, falling, and falling then rising. Thus, the phonetic word "Ma" can be pronounced with any one of these four tones and each one represents a unique meaning. This variation of the "Tone" in tonal languages would be viewed by musicians as variations of the pitch.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 11 is a flow chart illustrating the process methodology of the present invention in a preferred embodiment to determine appropriate exercises to present to the student;

FIG. 11A is a chart illustrating the methodology utilized in determining a student's reading level;

Similar reference characters refer to similar parts throughout the several views of the drawings.

DETAILED DESCRIPTION OF THE PREFERRED EMBODIMENT

Figure 1:
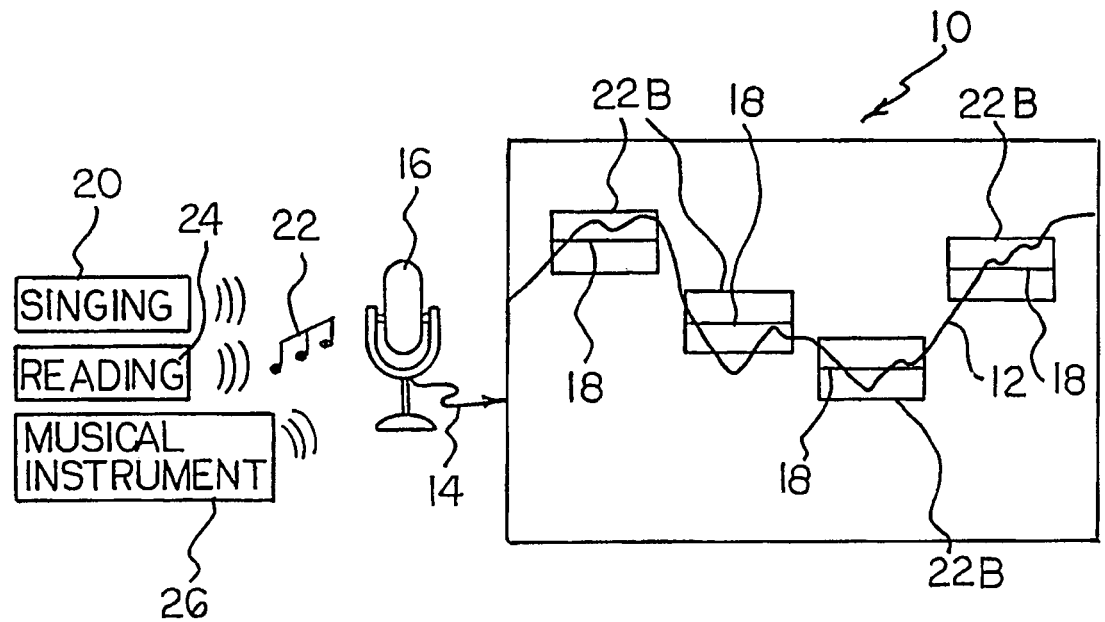
FIG. 1 is a diagrammatic view of the computer-aided learning system of the invention which graphically displays a pitch tracking line superimposed onto graphical pitch lines contained within target pitch boxes to provide a real time visual feedback of the pitch of one's voice relative to each note of the song being sung to aid the person to sing in tune with the notes of the song.

Referring to FIG. 1, the computer-aided learning system 10 of the invention graphically displays a pitch tracking line 12 of an input 14 such as an audible input from a microphone 16 superimposed onto graphical target pitch lines 18 representative of the desired pitches. In the preferred embodiment, the audible input 14 comprises a person who is singing 20 and the graphical display of the target pitch lines represent the musical notes 22 of the song being sung. The superposition of the pitch tracking line 12 over the target pitch lines 18 provides a real-time visual feedback of the pitch of one's voice relative to each note of the song being sung. The invention therefore aids the person to sing in tune with the notes 22 of the song.

The computer-aided learning system of the invention may also be employed for assisting a person such as a child to learn how to read 24 by "singing" the words of the text (or to learn a foreign language). More particularly, it is known that some of the factors affecting a person's ability to read include phonetic awareness, phonics, word recognition and vocabulary, comprehension and fluency. The use of the computer-aided learning system of the invention to sing the words of the text to be learned seems to remarkably enhance the reader's word recognition and vocabulary, comprehension and fluency.

The computer-aided learning system of the invention may also assist a musician to learn how to play a musical instrument 26 by providing a visual feedback of whether the proper notes 22 of the song are being played.

Without departing from the spirit and scope of this invention, this invention may in general be employed for assisting a person, whether an adult or a child, to learn to make audible sounds, whether vocally or with an instrument, by providing a visual real-time feedback to the person of the pitch of the sound superimposed onto the desired or targeted pitch.

Figure 2:
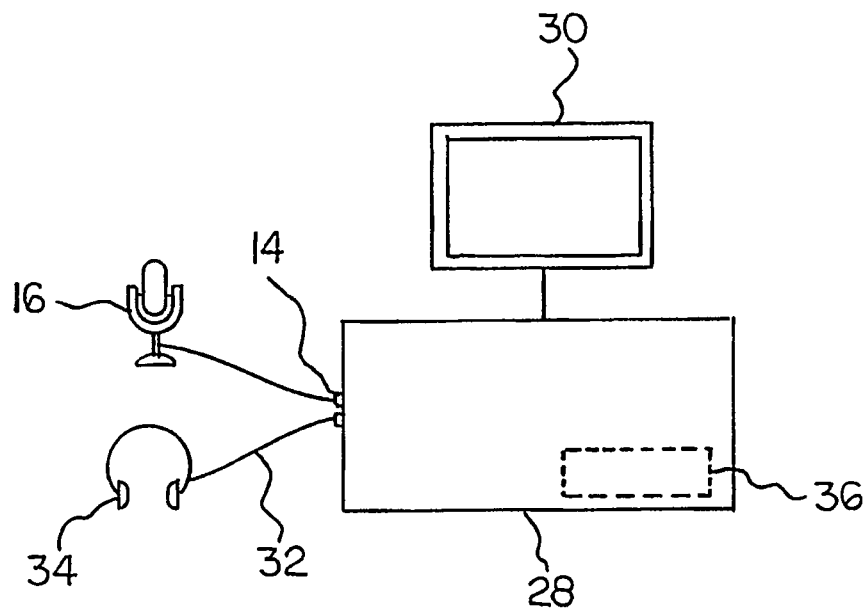
FIG. 2 is a block diagram of the various components of the computer-aided learning system of the invention.
Figure 1A:
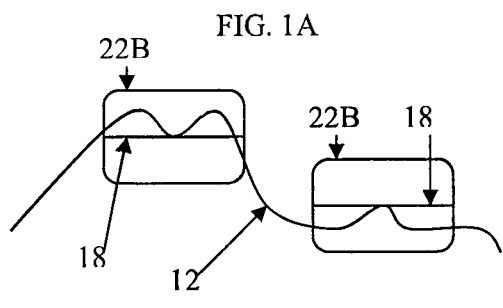
FIGS. 1A, 1B, 1C, 1D, 1E, and 1F are callouts depicting, respectively, target pitch areas shaped as rectangles with rounded edges, ellipticals, octagons, circles, diamonds, and hexagons.
Figure 1B:
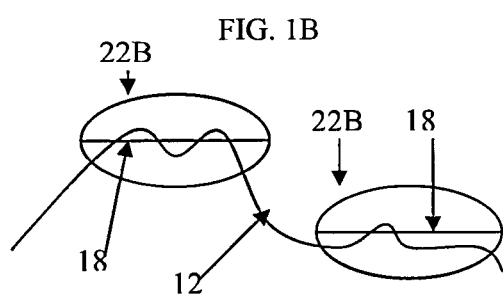
Figure 1C:
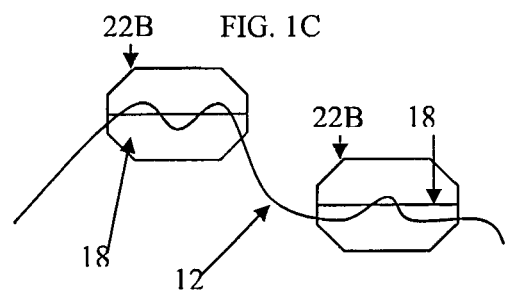
Figure 1D:
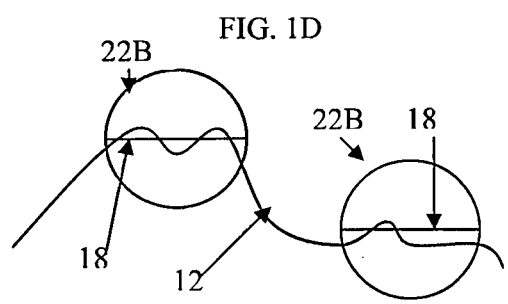
Figure 1E:
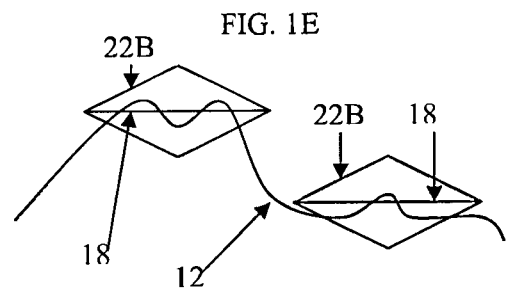
Figure 1F:
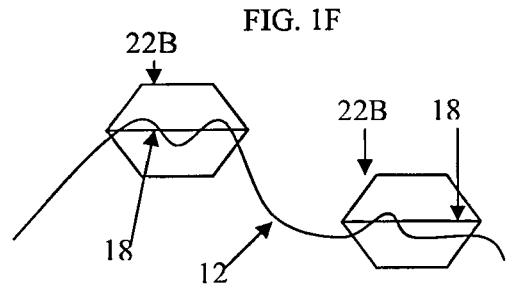

More particularly, referring to FIG. 2, the computer-aided learning system 10 of the invention comprises a computer 28 having an internal or external graphical display 30 (e.g., CRT, LCD, Plasma). Computer 28 further includes an audio interface for receiving an input 14 such as from the microphone 16 and for providing an audio output 32 to headphones 34 or speakers. Computer 28 preferably comprises a general purpose personal computer that employs an operating system such as Microsoft Windows, Unix, or Apple Mac OS that runs application software. However, computer 28 may comprise a dedicated computer including suitable hardware and firmware that implements the functionality of the invention 10. Further, the invention 10 may comprise a distributed system wherein the audio input 14 and display 30 comprises a voice-over IP (e.g., Internet video phone) or wireless input (e.g. cell phone with a visual display) and computer 28 comprises a remote server computer running the computer program 36.

Figure 3:
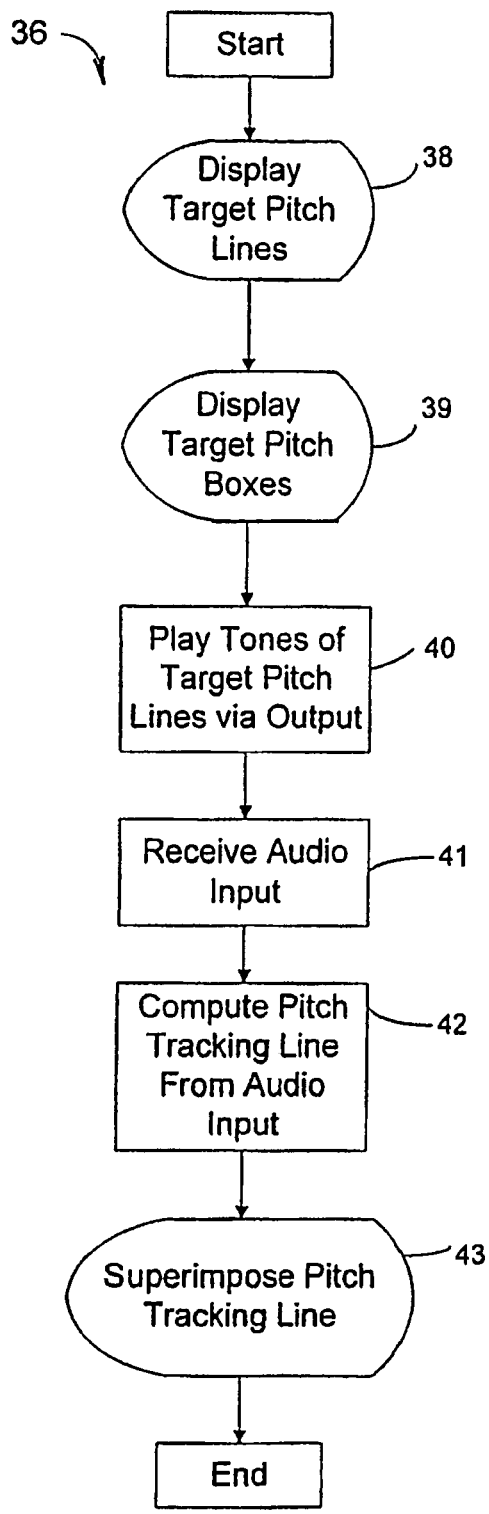
FIG. 3 is a flow chart illustrating the process methodology of the computer program in its preferred embodiment to display the pitch tracking line in real time.

Referring to FIG. 3, the invention 10 is embodied in a computer program 36 that in the preferred embodiment runs as application software on the computer 28 (or is hardware/firmware implemented on a dedicated computer) to display 38 the target pitch lines 18 on the display 30, to display 39 the target pitch boxes about the target pitch lines 18, to audibly play 40 the tones of the target pitch lines 18 via the audio output 32 (if desired), to compute 42 the pitch tracking line 12 from the input 14 and to superimpose 43 the pitch tracking line 12 in real time onto the target pitch lines 18 displayed on the display 30.

The computer program 36 determines the user's actual vocal range before displaying 38 the desired pitch lines 18 on the display 30. The computer program 36 then transposes the song to be sung into the optimum key best corresponding to the user's actual vocal range. Apart from transposing the song into a different key (e.g. C to G), the computer program 36 may also or alternatively move the arrangement of the song up or down one or more octaves.

As used herein, the user's vocal range is the range of notes, from lowest to highest, that the user can vocalize or sing comfortably. The two steps in determining one's vocal range is to first sing up from a low note to a high note and second, to sing down from a high note to a low note.

Figure 4:
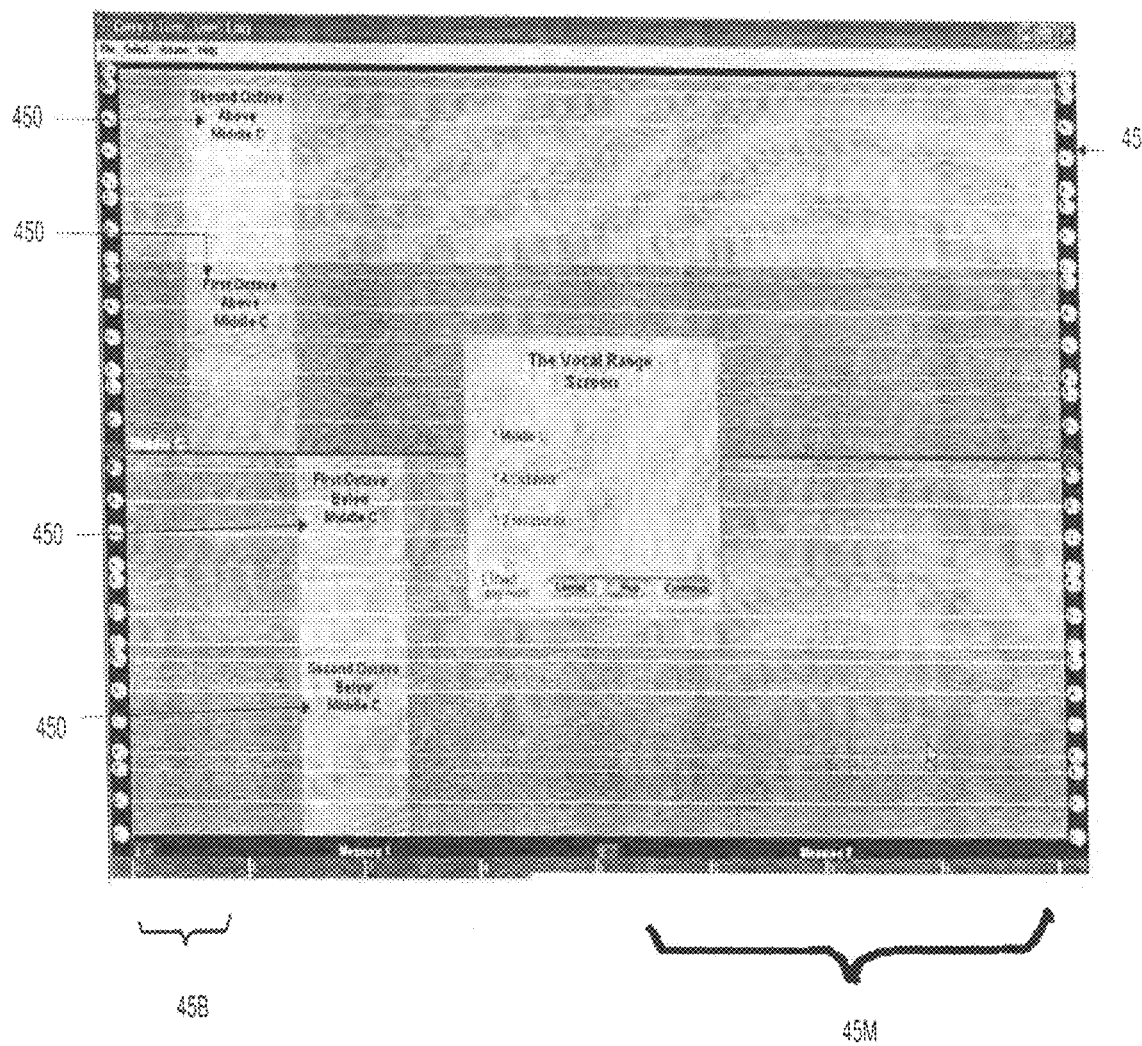
FIG. 4 depicts a vocal range screen and the octaves and measures thereof.

More particularly, FIG. 4 depicts a Vocal Range Screen 45 with four octaves 45O, with the "middle C" in the center. The Vocal Range Screen 45 comprises two measures 45M, indicated at the bottom of the screen as Measure 1 and Measure 2. Each measure 45M is divided into 4 beats 45B.

Figure 4A:
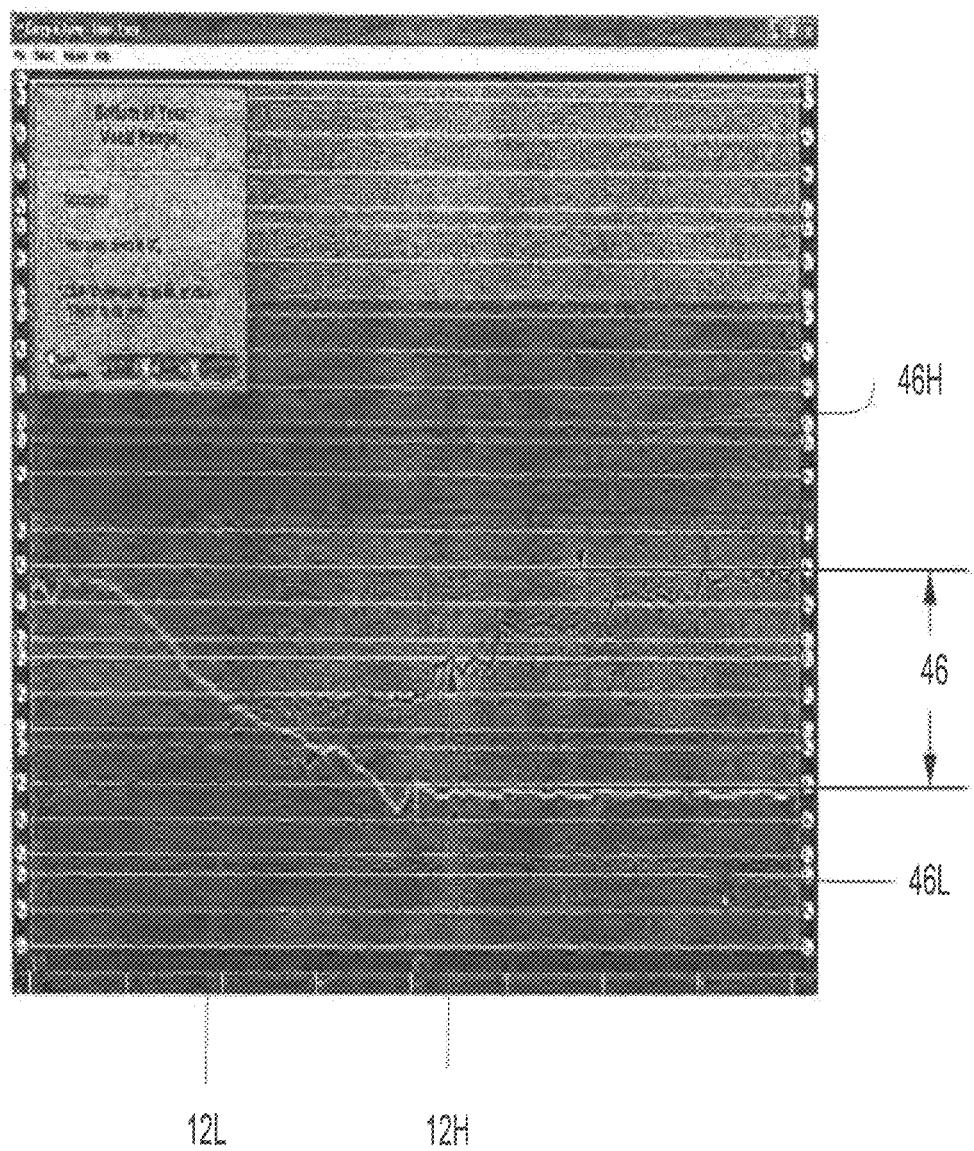
FIG. 4a depicts the vocal range screen used by an exemplary user to compute the user-specific vocal range.

To begin vocal range measuring, four "count-off" or "lead-in" metronome ticks are played via the headphones 34 to inform the user to get ready to sing. After the fourth tick, the user sings from a low tone to the highest note that can be comfortably sung. The process is repeated from a high note to the lowest note that can be comfortably sung. FIG. 4a shows the resulting pitch tracking lines 12L and 12H of an exemplary user that graphically illustrate the highest and lowest notes the user comfortably sang.

The computer program 36 of the invention interpolates a line 46H relative to the highest notes and specific vocal range 46 comprises the difference between the interpolated lines representative of the user's highest and lowest notes. Using this user-specific vocal range, the computer program 36 then transposes the song to the optimum key (or up or down one or more octaves) and displays the transposed target pitch lines and boxes accordingly.

Figure 5:
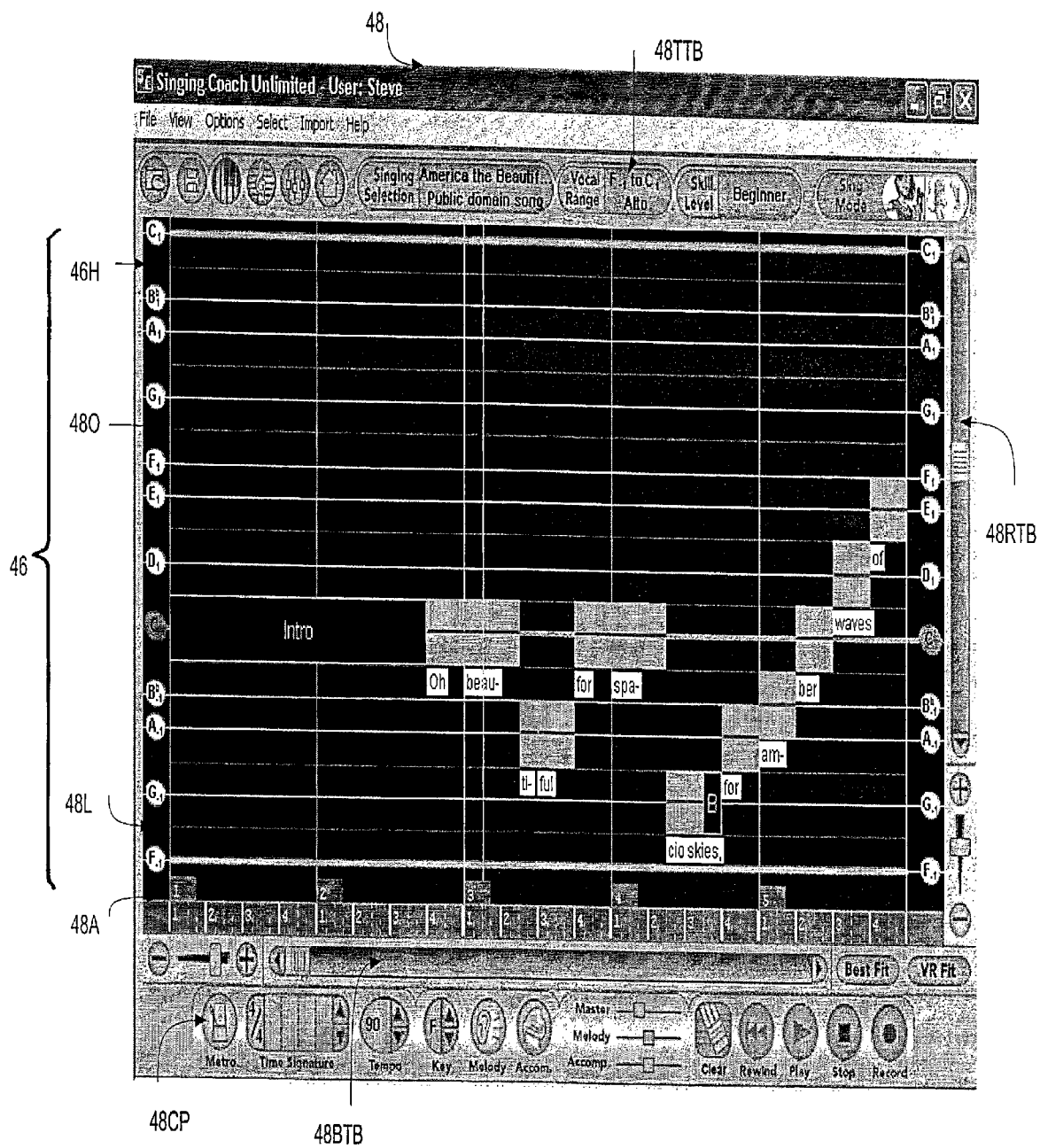
FIG. 5 illustrates the preferred layout of the "sing window" for displaying the target pitch lines and boxes on the display.

FIG. 5 illustrates the preferred layout or "Sing Window" 48 for displaying 38 the desired pitch lines 18 on the display 30. The ordinate 48O of the Sing Window 48 represents the transposed key of the song best corresponding to the user-specific vocal range 46. Diatonic notes are illustrated in the ordinate with normal brightness whereas non-diatonic notes are illustrated in a reduced, grayed-out brightness. The appearance of the diatonic and non-diatonic notes provides a visual display to the user to facilitate singing in tune by visualizing the distance between the notes to be sung. This also facilitates the skills of improvisation. The abscissa 48A of the Sing Window 48 represents the measures 48M and their beats 48B (e.g., for a 4/4 song each measure 48M would include four beats 48b whereas for a 3/4 song each measure 48M would include three beats 48b).

For ease in explanation, the FIG. 5 illustrates the beginning of the song "America The Beautiful" to be sung. Having previously determined, saved and now recalling from memory the user-specific vocal range, the key of the song is transposed to best correspond to such user-specific vocal range 46. The vocal-range-adjusted notes 22 of the song are then displayed 30 in the Sing Window 48 by the target pitch lines 18 displayed horizontally in the center of a generally rectangular target pitch box 22B. The vertical placement of the target pitch line 18 of each target pitch box 22B is aligned relative to the ordinate 48O to correspond to the particular musical note (C, B, A, etc.).

The length 22L of each graphical pitch line 18 and hence the length 22L of each target pitch box 22B corresponds to the beat of the respective note 22 (¼, ½, ¾ beat, etc.) to be sung. The words of the lyrics 22W corresponding to each note 22 of the song are preferably displayed underneath each respective target pitch box 22B. Breath Rests 22R of the song are preferably depicted in the Sing Window 48 as empty boxes that serve as placeholders to signal when to take a breath.

Figure 5A:
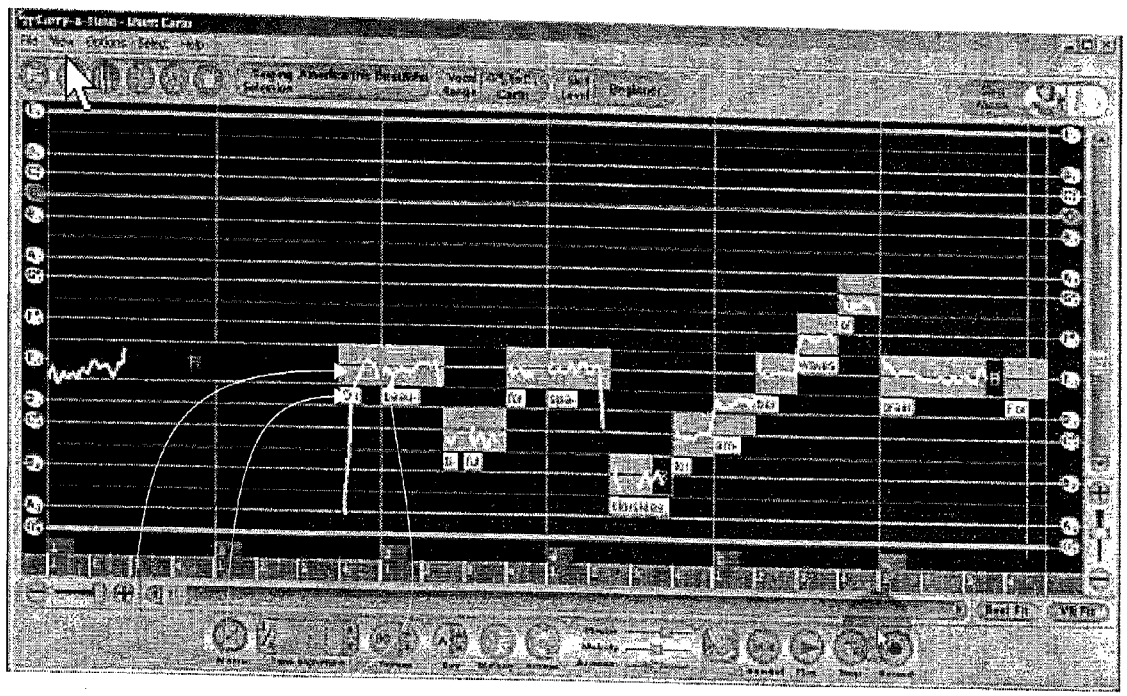
FIG. 5a depicts the "sing window" of FIG. 5 with a user's pitch tracking line superimposed over the target lines and boxes of the song being sung.

As shown in FIG. 5a as the user sings, the pitch tracking line 12 is superimposed onto the Sing Window 48. When singing the song in tune, the pitch tracking line 12 roughly follows the respective target pitch lines 18 for the notes and is therefore encompassed in the respective target pitch boxes 22B whereas when singing the song out of tune or off beat, the pitch tracking line 12 falls outside the respective target pitch boxes 22B. The pitch tracking line 12 being displayed within the target pitch box 22B is visually indicative of singing the song in tune and on beat.

The skill level of singing the song in tune and on beat may be modified by reducing the height 22B of the target pitch boxes 22B and allowing a transition time 22T between adjacent target pitch boxes 22B, respectively.

Figure 5B:
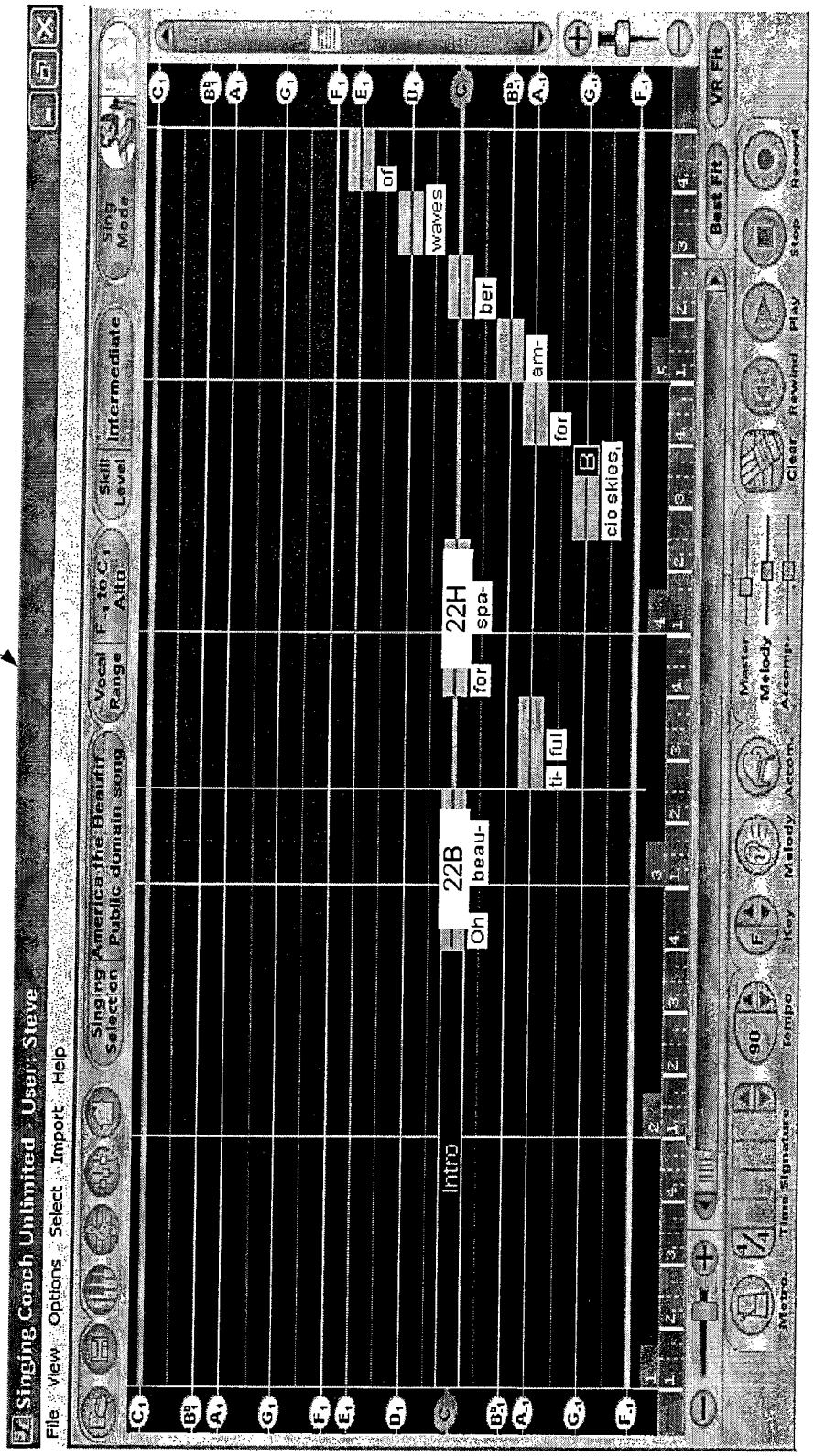
FIGS. 5b and 5c illustrate the "sing window" of FIG. 5a but with reduced height target pitch boxes indicative of intermediate and expert skill levels, respectively.
Figure 5C:
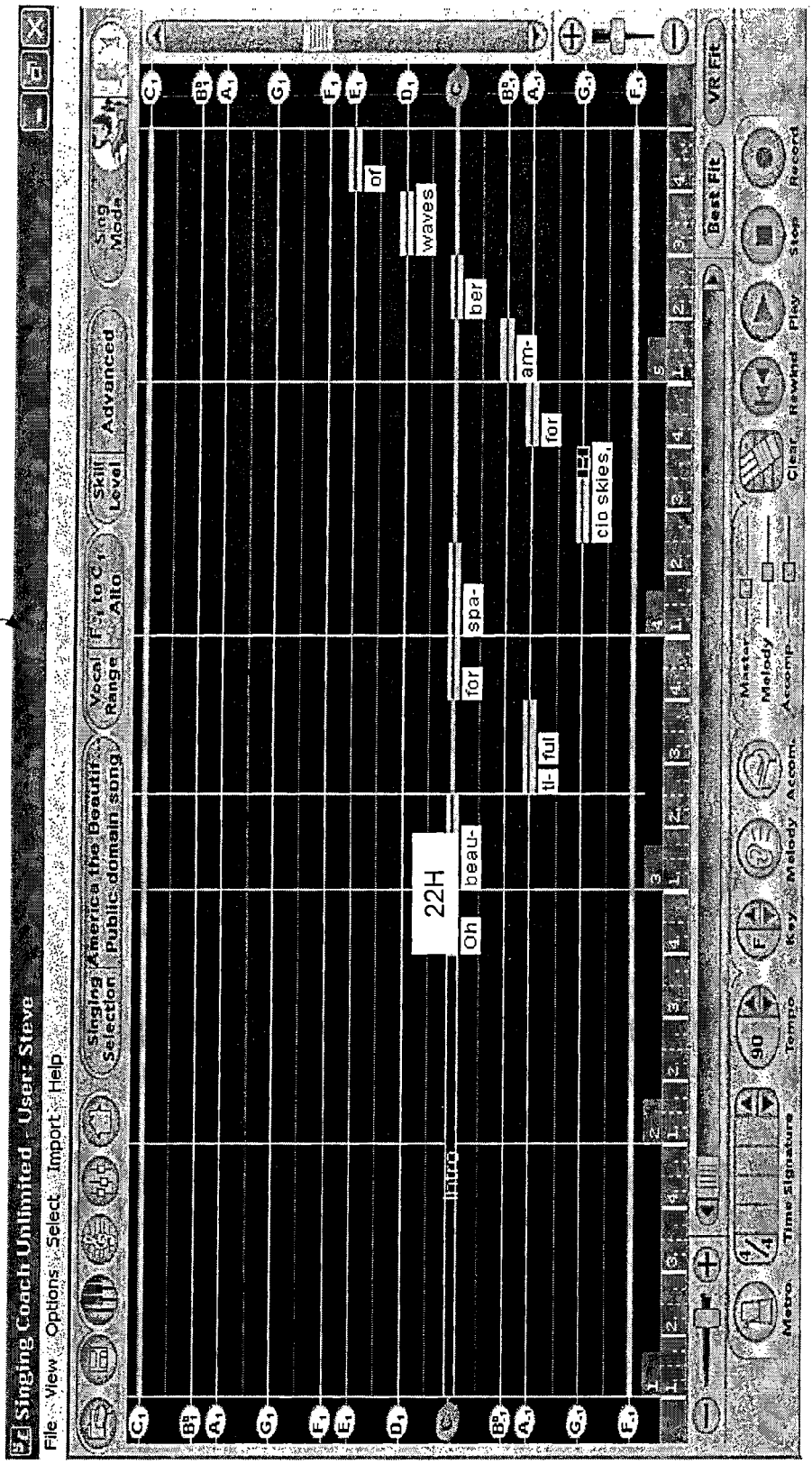

More particularly, for purposes of illustrating the skill levels of singing in tune, FIGS. 5b and 5c illustrate the same pitch tracking line 18 for the "America The Beautiful" of FIG. 5a, but with reduced-height target pitch boxes 22B. In comparison, the tall height 22H, medium height 22H and low height 22H of the target pitch boxes 22B of FIGS. 5a, 5b and 5c, represents a "beginner", "intermediate" and "expert" skill levels, respectively, because more accuracy in staying within the target pitch boxes 22B (i.e., singing in tune) is required as the heights of the target pitch boxes 22B are progressively decreased proportional to the skill level.

Figure 5D:
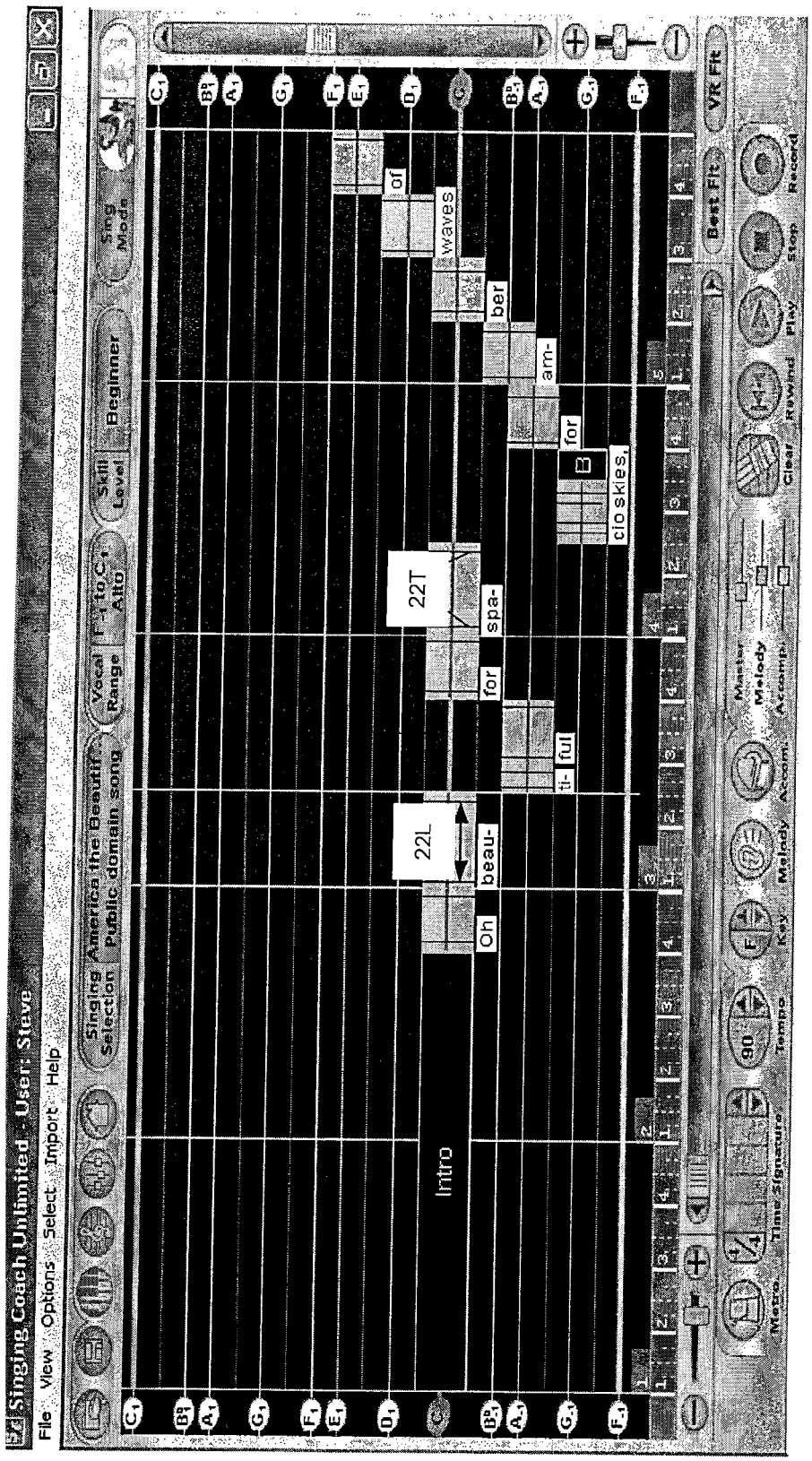
FIGS. 5d and 5e illustrates the same window as FIG. 5a but with the length of the target pitch boxes being increased to reduce the transition time between adjacent notes indicative of "intermediate" and "expert" skill levels, respectively.
Figure 5E:
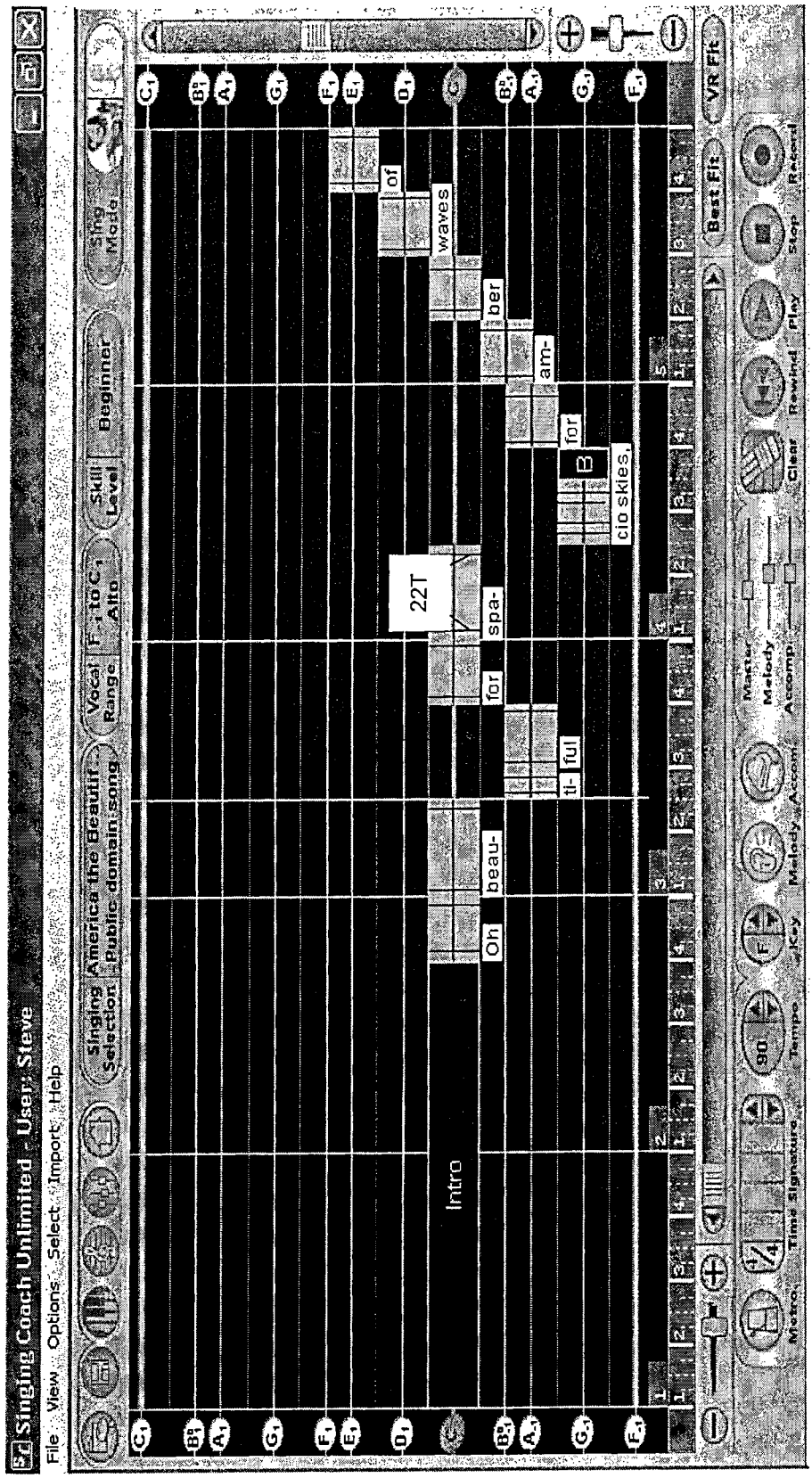

For the purpose of illustrating the skill level to sing in rhythm (i.e., to quickly transition from one note to another), FIGS. 5d and 5e illustrate "America The Beautiful" of FIG. 5a, but with the length 22L of the target pitch boxes 22B being increased to allow for a transition time between adjacent notes 22B. The transition time between adjacent notes 22B is preferably represented visually by grayed-out or empty transition boxes 22T at the end of each target pitch box 22B or optionally at both the beginning and end of each target pitch box 22B. The length of the transition boxes 22T is preferably visually depicted in relation to 1/16, 1/8 or 1/4 beats indicative of an "expert", "intermediate" and "beginner" skill levels (FIGS. 5e, 5d & 5c), respectively, because, as more transition time is allowed to begin singing the next note, the easier it is to stay within the target pitch boxes 22B (i.e., singing in beat).

The percentage of time of singing the song in tune and on beat (i.e., staying within the target pitch boxes 22B) versus out of tune (going outside the target pitch boxes 22B) or off-beat (transitioning outside the transition boxes 22T), may be used as a way of "scoring" how accurately the user sang the song in tune and on beat. More particularly, the computer program 36 of the invention computes the ratio of the amount of time the user sang in tune and on beat by summing the total time the pitch tracking line 12 fell within the respective target pitch boxes 22B divided by the sum of the lengths of all the target pitch boxes 22B (specifically excluding the transition boxes 22T). The ratio thus represents the user's "score" in singing in tune and on beat.

While it shall be understood that the functionality of the features discussed above may be implemented with many layouts of the Sing Window 48 without departing from the spirit and scope of this invention, the most preferred layout of the Sing Window 48 is illustrated in FIG. 5 in which the Sing Window 48 is surrounded by a top toolbar 48TTB, a right toolbar 48RTB, a bottom toolbar 48BTB and a bottom control panel 48CP.

Figure 6:
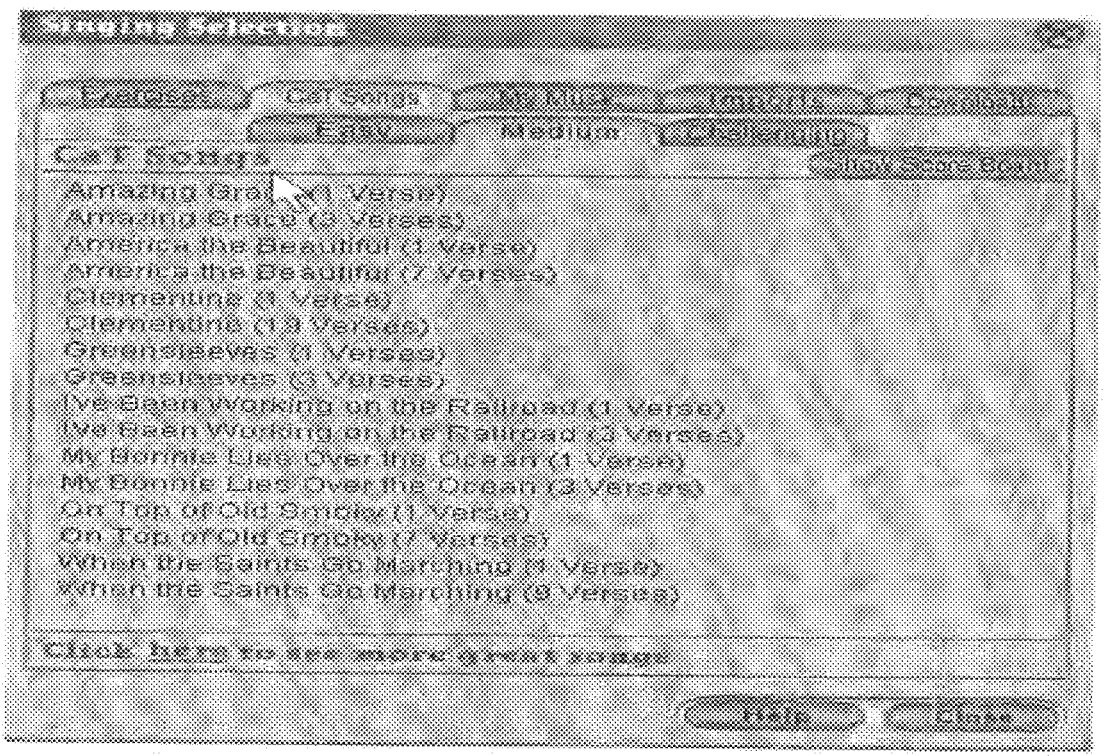
FIG. 6 illustrates the "sing window" of the invention with tabs allowing selection of various options.

The top toolbar 48TTB includes a Singing Selection button that opens a Singing Selection window. FIG. 6 illustrates the Singing Selection window having tabs for allowing the user to select an easy, moderate or challenging song that had been previously downloaded (and if sung by this user, their previous scoring thereof), a series of exercises that may be sung (i.e., unisons, intervals or warm-ups), created songs, imported songs and downloaded songs.

The top toolbar 48TTB further includes a Vocal Range button that allows the user to manually override the user-specific vocal range 46 and select a bass, baritone, tenor, alto, or soprano vocal range. The top toolbar 48TTB further includes a Skill Level button allowing the user to select the desired skill level. A toggle Sing/Compose button allows the user to switch between the sing and compose modes of operation. Finally, the top toolbar 48TTB includes toggle Keyboard, Sheet Music, Mixing Board and Home buttons to switch to a view containing a representation of a keyboard, to the Sheet Music view, to a view containing a mixing board and to return to the Home screen (see FIGS. 7a, 7b, 7c and 7d, respectively.

The right and bottom toolbars 48RTB and 48BTB comprise vertical and horizontal sliders to allow the Sing Window 48 to be scrolled vertically and horizontally, respectively. To change how much of a song appears in the Sing window, the Sing Window may also be zoomed in or out on by zoom controls. The vertical zoom control is preferably located immediately below the vertical slider on the right toolbar 48RTB and changes the number of pitch lines visible in the window. The horizontal zoom control is preferably to the left of the horizontal slider on the bottom toolbar 48BTB and changes the number of measures that appear in the Sing Window.

Best Fit and Vocal Range (VR) Fit buttons preferably located on the bottom toolbar 48BTB provide vertical display controls to adjust the vertical display so that the highest and lowest notes of a song or exercise will appear in the Sing Window without scrolling and to adjust the vertical display so that the user-specific vocal range fits in the window.

The lower control panel 48CP allows the user to control how a song is played and includes a Metronome toggle button to turn a metronome sound on and off, a Time Signature toggle button to show the currently selected time signature, a Tempo selector button that displays the current tempo and allows the tempo for the current song or exercise to be increased or decreased, a Key selector button that allows the user to change the key for the current song, thereby overriding the manually optimum key that corresponds to the user-specific vocal range, Melody and Accompaniment toggle buttons to turn on and off the melody and accompaniment (i.e., a cappella) during playing, Volume Controls selector buttons including a Master Volume slider, a Melody slider and an Accompaniment slider, Transport buttons for clearing the display and preparing for a new session, for rewinding by moving the vertical cursor to the beginning of a song, for playing what is displayed and for stopping the playing. It is noted that the current position in the song being played is indicated by a vertical cursor line.

Figure 8A:
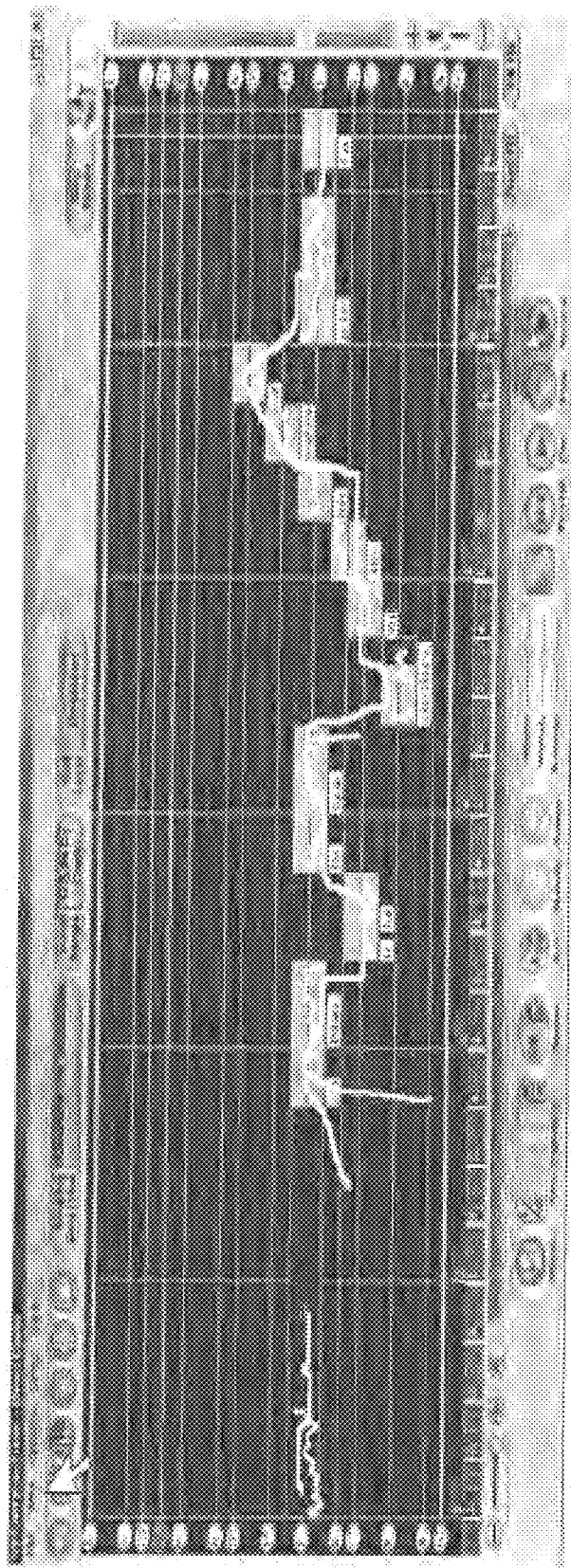
FIG. 8a illustrates a single sing window containing two pitch tracking lines for two users.
Figure 8B:
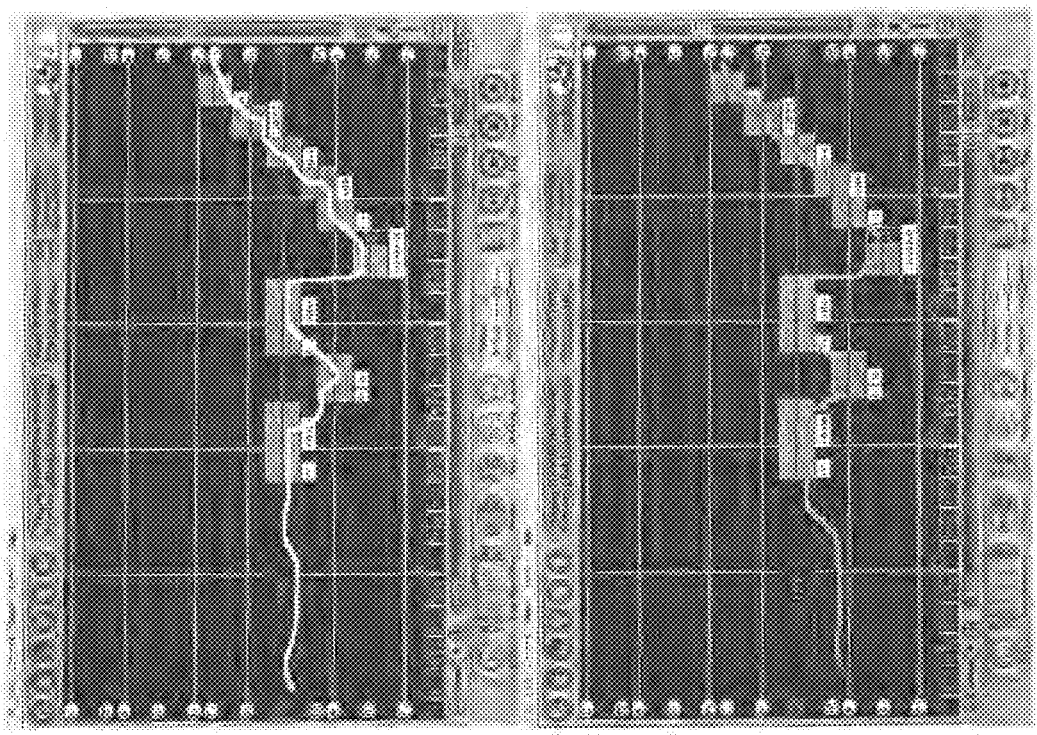
FIG. 8b illustrates two sing windows, stacked one on the other, for use by respective two users.

The invention may be used by two or more singers to practice their singing. More particularly, in the case of two users as shown in FIGS. 8a and 8b, either two pitch tracking lines (one for each user) may be displayed in the same Sing Window or two Sing Windows (one for each user) may be displayed in a stacked arrangement, each with their own or individually-used toolbars and control panels discussed above. Similarly, four users may be displayed in four Sing Windows displayed in four quadrants of a display or, if two displays are available (i.e., adjacent monitors) the four users may be displayed in two stacked Sing Windows in each of the displays. For multiple users, it is noted that the computer 28 would include multiple inputs 14 (e.g., separate audio cards or USB ports) for the user's respective microphones 16.

Figure 9A:
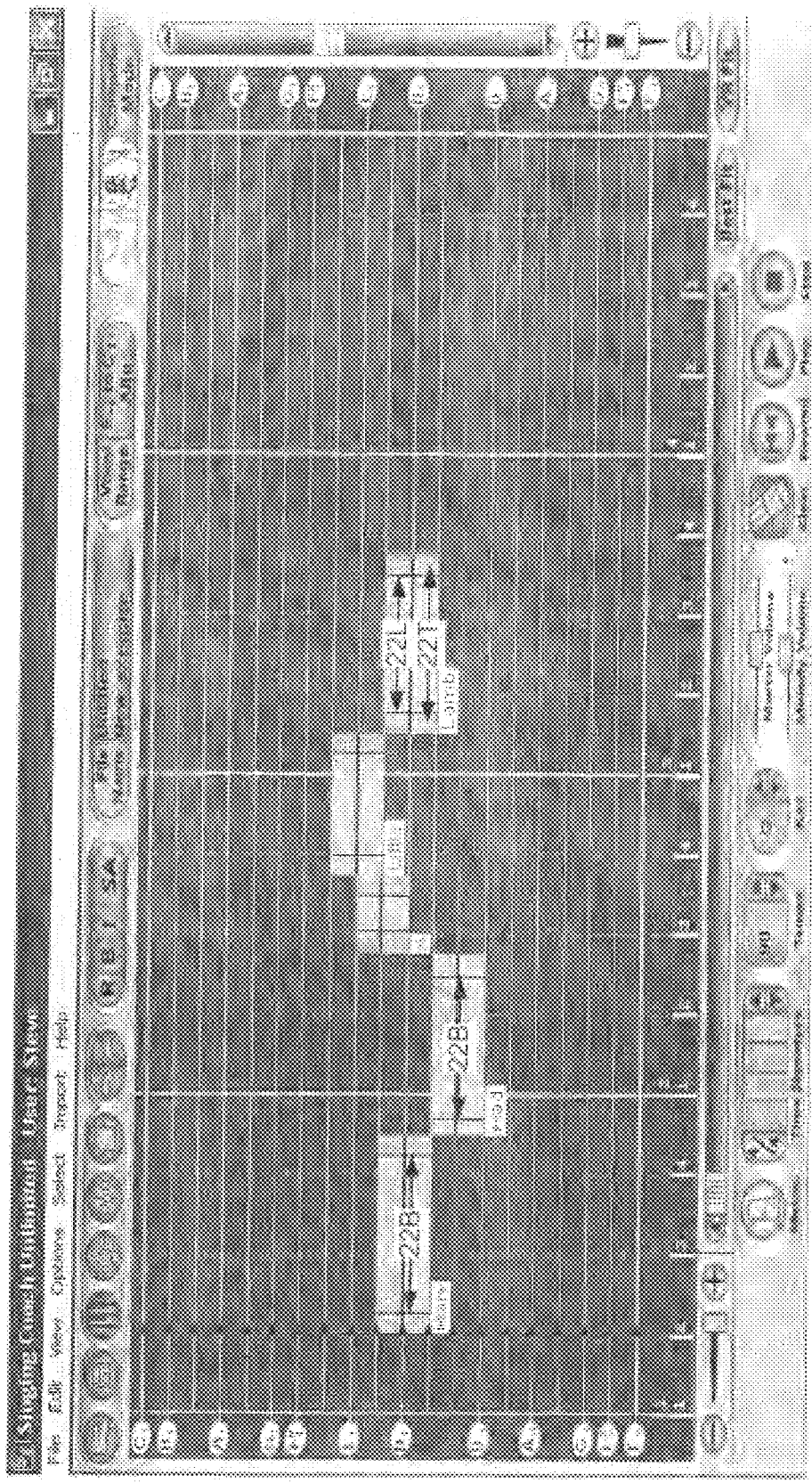
FIG. 9a illustrates a compose window allowing the user to create a song.
Figure 9B:
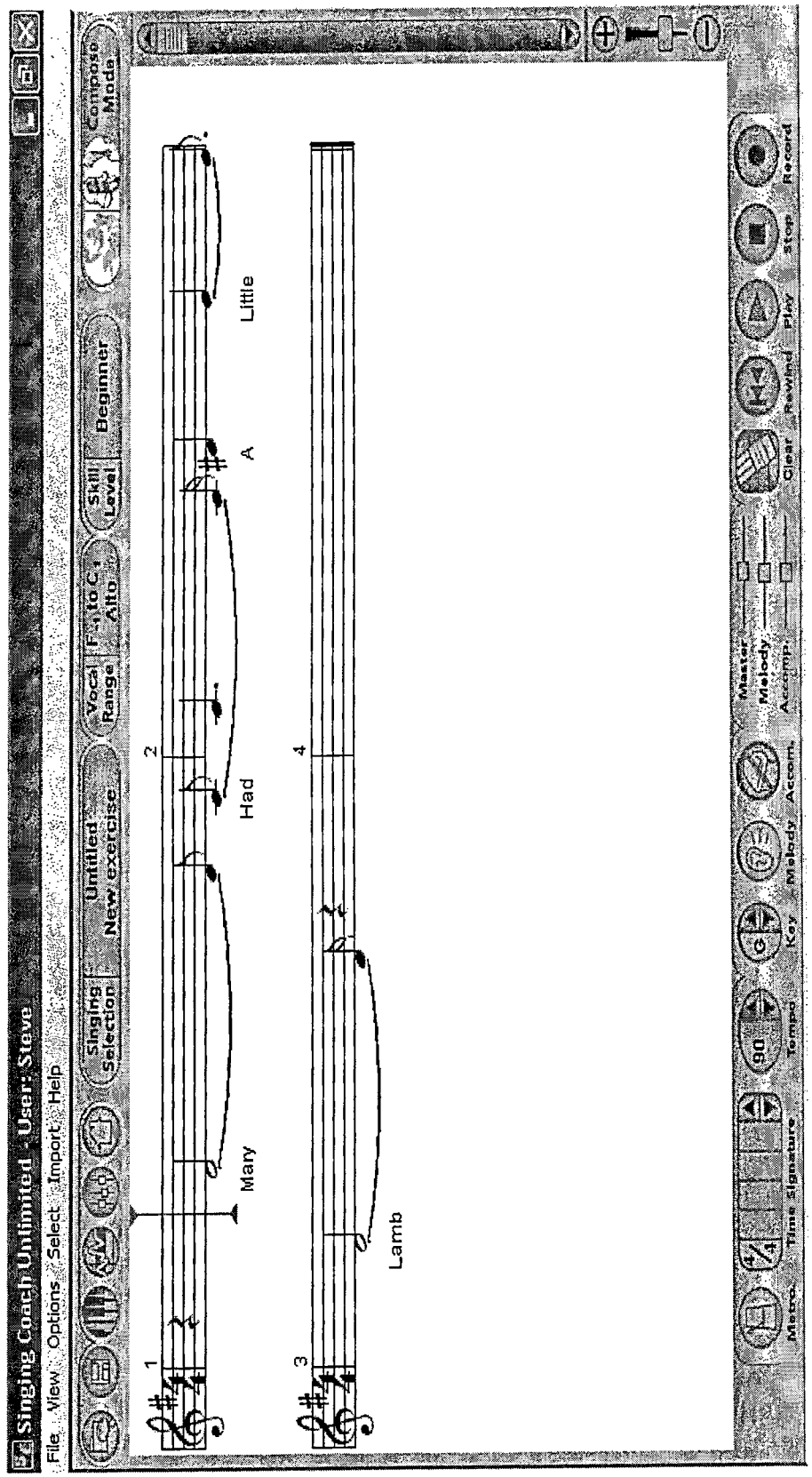
FIG. 9b illustrates the composed song of FIG. 9a in sheet music view.

As shown in FIG. 9, the computer program 36 of the invention allows a user to create a song via a Compose Window by simply creating the desired length target pitch boxes 22B for each note of the song being created. Further, the desired lyrics of the song may be textually entered at the bottom of each target pitch box 22B. Once created, the song may be saved to memory and played in the same manner as any previously-recorded song.

Figure 7A:
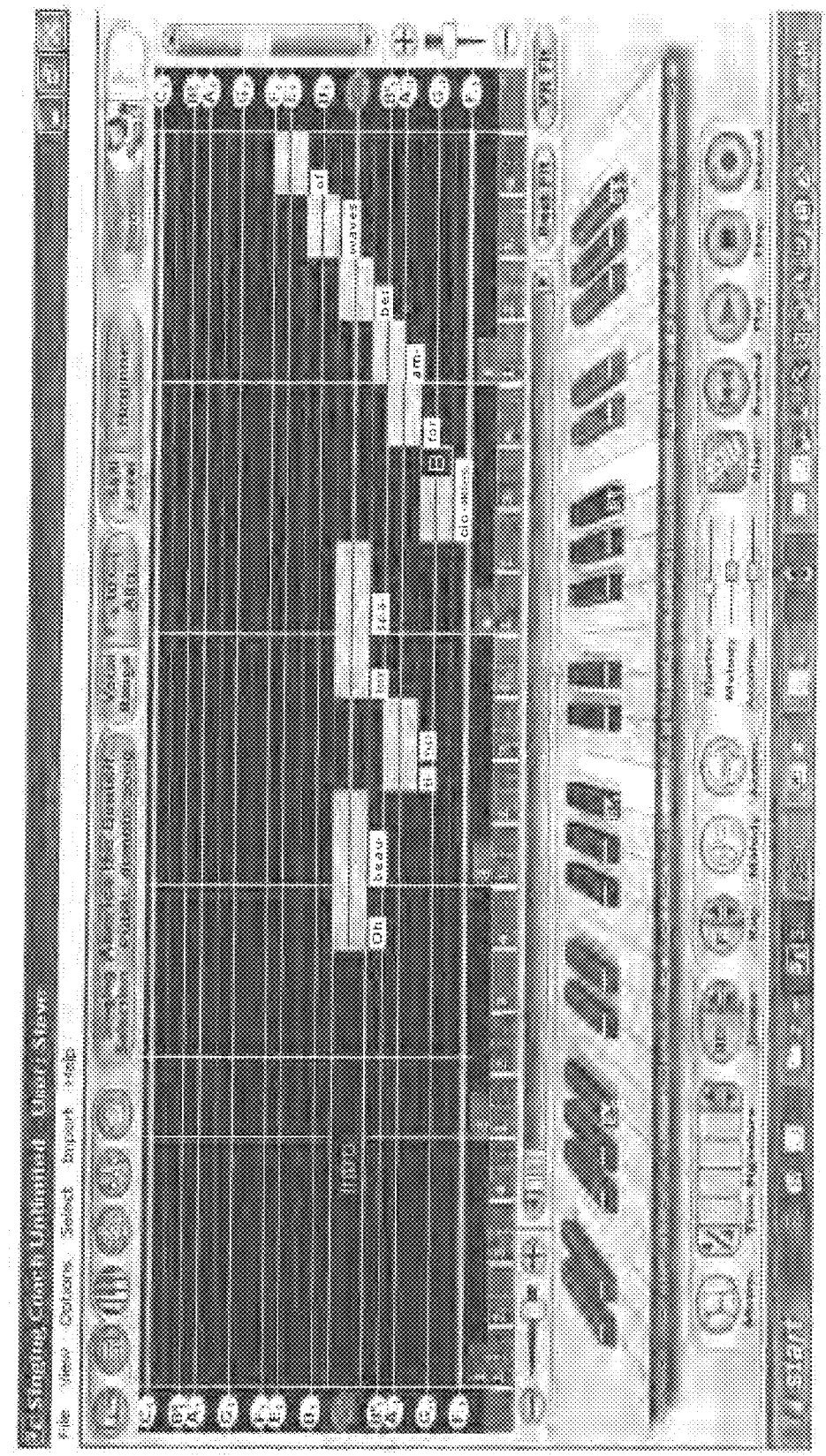
FIGS. 7a, 7b, 7c and 7d depict the keyboard view, sheet music view, mixing board view and home view screens, respectively.
Figure 7B:
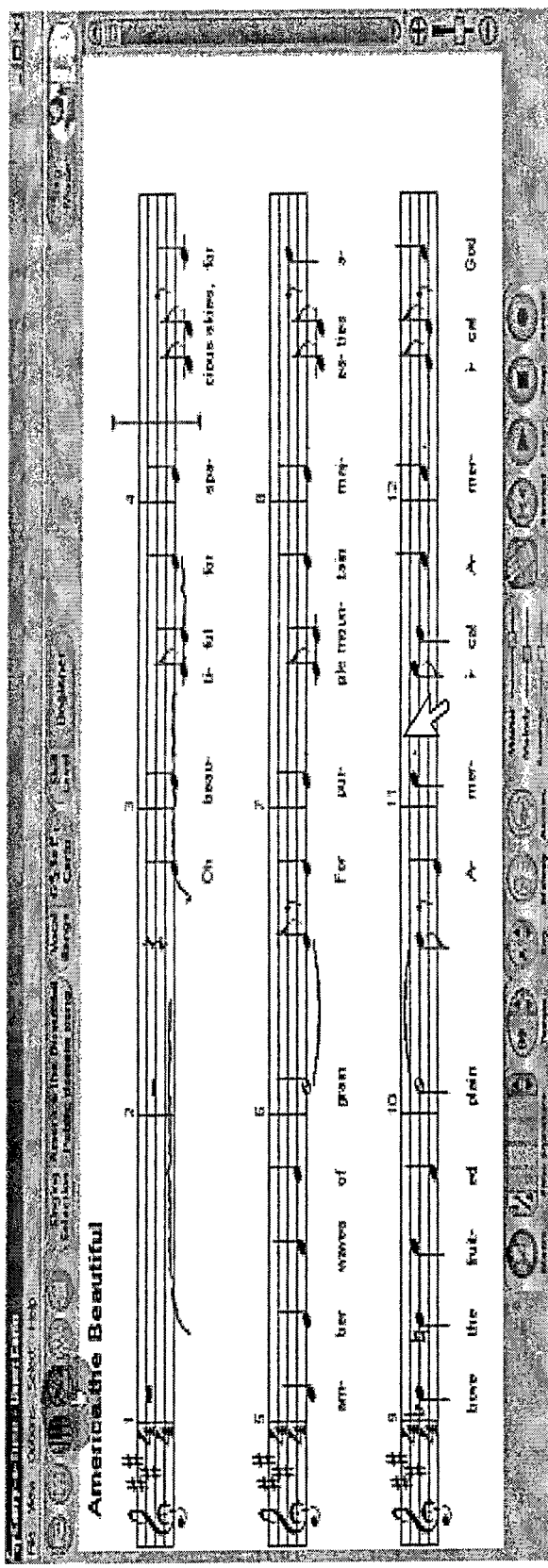
Figure 7C:
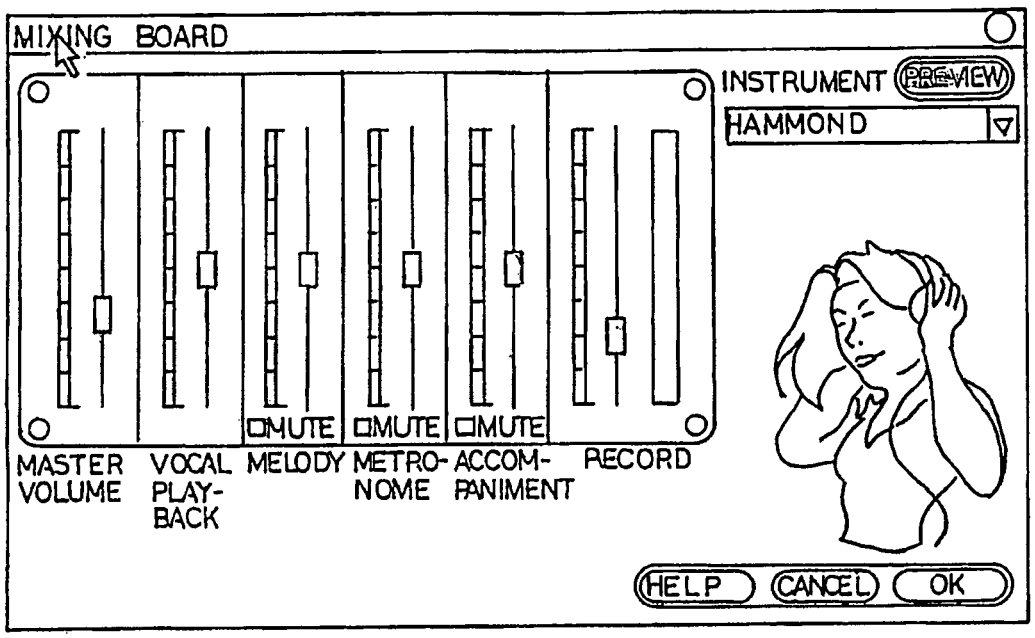
Figure 7D:
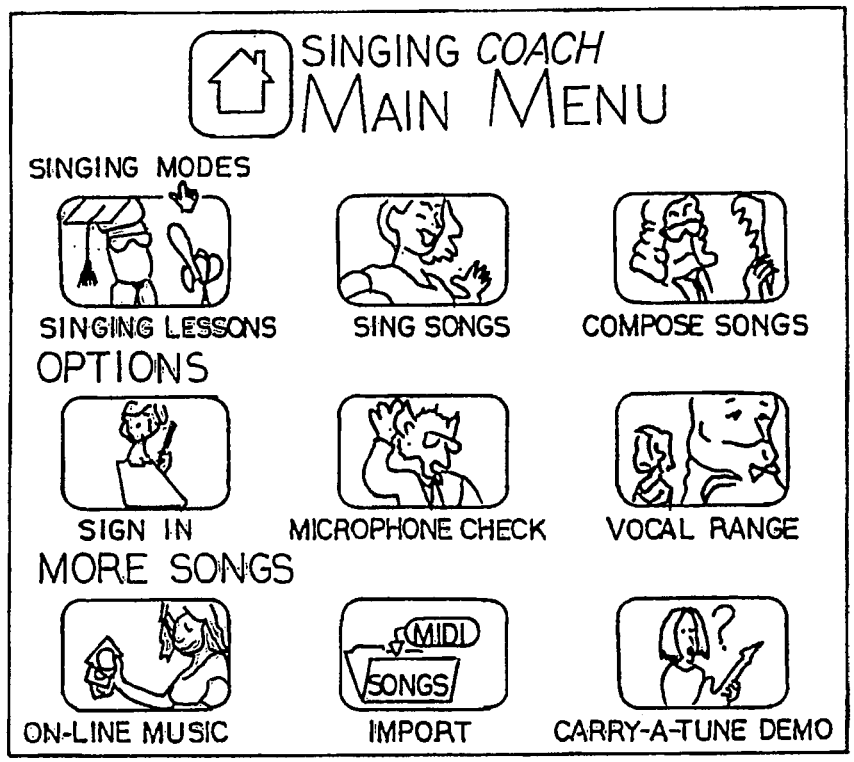

As depicted in the Home Screen of FIG. 7d, Singing Mode buttons are provided for a Singing Lessons utility, the Sing Songs utility and the Compose Songs utility. Option buttons are included for a Sign-In utility to allow a user to sign in, for a Microphone Check utility to verify the performance of the microphone 16 and for the Vocal Range utility to create a user-specific Vocal Range or to retrieve from memory one previously created to then be used or modified. Finally, the Home Screen further includes More Songs and Demo buttons for accessing an On-Line Music Store to purchase songs, an Import utility for importing songs and a Demonstration utility for demonstrating, via a recorded audio/video, the various features of the computer program 36.

The foregoing has described the functionality of the subject invention in general terms without reference to any particular proprietary or industry-standard format for the song files. It should be appreciated that while many file formats are possible, the preferred embodiment of the subject invention is best implemented through the use of industry-standard MIDI (Musical Instrument Digital Interface) file formats for the songs to be played. By way of background, every MIDI song file comprises performance data recorded by a MIDI sequencer in the form of well-defined MIDI structures including sequential status bytes and corresponding data bytes that together define a communications protocol for instructing a MIDI synthesizer how to play the song. Unlike a WAV or other analog recording of a song, a MIDI file does not contain any analog data. A more complete description of MIDI files may be found in The Complete MIDI 1.0 Detailed Specification, the disclosure of which is hereby incorporated by reference herein, available from the MIDI Manufacturers Association's website www.midi.org.

More particularly, when a particular song is to be displayed on the Sing Window 48, the computer program of the invention 36 reads the MIDI file of that particular song from memory (e.g., hard disk, CD-ROM, etc.) and interprets the MIDI structures to ascertain the status bytes and the data bytes for each note and its duration, as well as the key, melody and the accompaniment. From this interpreted MIDI information, the computer program has all of the information needed to draw the Sing Window 48 target pitch lines in the Sing Window 48. The computer program then draws the target pitch boxes 22B about the target pitch lines at the desired skill level. The target pitch boxes are then used to then compute the baseline for scoring.

As the user sings the song, the computer program 36 records the user's voice in analog form such as in a time-stamped WAV file corresponding to the MIDI song file. A pitch tracking algorithm in the computer program computes the X-Y coordinates of the pitch tracking line and time-stamps them to superimpose them on the Sing Window. The coordinates and time stamps of the pitch tracking line are saved to a control file corresponding to the WAV file whereupon the control file may be subsequently read to reconstruct the pitch tracking line of the user's previous singing of the song and displayed on the Sing Window with the target pitch boxes 22B. Alternatively, instead of storing the coordinates and time stamps of the pitch tracking line in a control file, the pitch tracking line may be simply recomputed upon the playing of the WAV file to replay the previously-recorded singing of the song.

The computer program may change the song's key, melody and accompaniment by changing the corresponding status and data bytes of the MIDI song file before playing. Upon playback, the computer program plays the MIDI file and the voice file in separate threads such that they are synchronized during playback.

As noted above, the computer program allows a user to compose a song. Composed songs are preferably sequenced by the computer program into a MIDI file and stored as a MIDI file to be played as noted above in synchrony with the user's WAV file containing his or her voice.

In an alternative embodiment, the present invention provides a method for teaching students how to read. In fact, utilizing one embodiment of the present invention, middle school students improved their reading grade levels 1 to 3 grades in just nine weeks! This innovative approach addresses the five big areas of reading: (1) phonemic awareness; (2) phonics; (3) vocabulary; (4) fluency; and (5) comprehension.

This innovative approach to teaching relies upon a student's independent reading level, instructional reading level and frustration reading level. The independent (or free) reading level is the level at which a student can read text without a teacher's assistance. The instructional reading level is the level at which a student is challenged by the reading material, but is not yet frustrated by the material. The instructional reading level is the level at which a student should receive reading instruction. At the instructional reading level, the student reads with teacher guidance, and is challenged enough to continue reading grown.

The frustration reading level is the level at which a student has sufficient difficulty with the material that the student is frustrated by the materials. At the frustration reading level, the student can not read text adequately, and the student frequently shows signs of discomfort. Unfortunately, with current teaching techniques, students are too often called upon to continue to attempt to improve their reading abilities through assignments that present the student only with frustration reading level materials.

Through the present invention, students are taught to read based upon the individual student's own reading and learning capability, as opposed to the generalized classroom approach wherein each student must advance or stall based upon the collective progress of the entire class. Using the present invention, a student is first presented with an improvement of a Cloze test in order to determine the student's instruction and frustration reading levels.

Typical Cloze tests provide a user with a section of prose, wherein fifty words have been omitted from the section. The user is then called upon to provide the missing words. This is typically done in a manual fashion, where the student writes down his or her answers, and a teacher determines what percentage the student correctly scored. Unfortunately, all too often, teachers give credit to students for answers that are not 100% correct (such as a misspelling) or fail to give credit for proper answers (such as when a teacher inadvertently marks a correct answer wrong).

Figure 10:
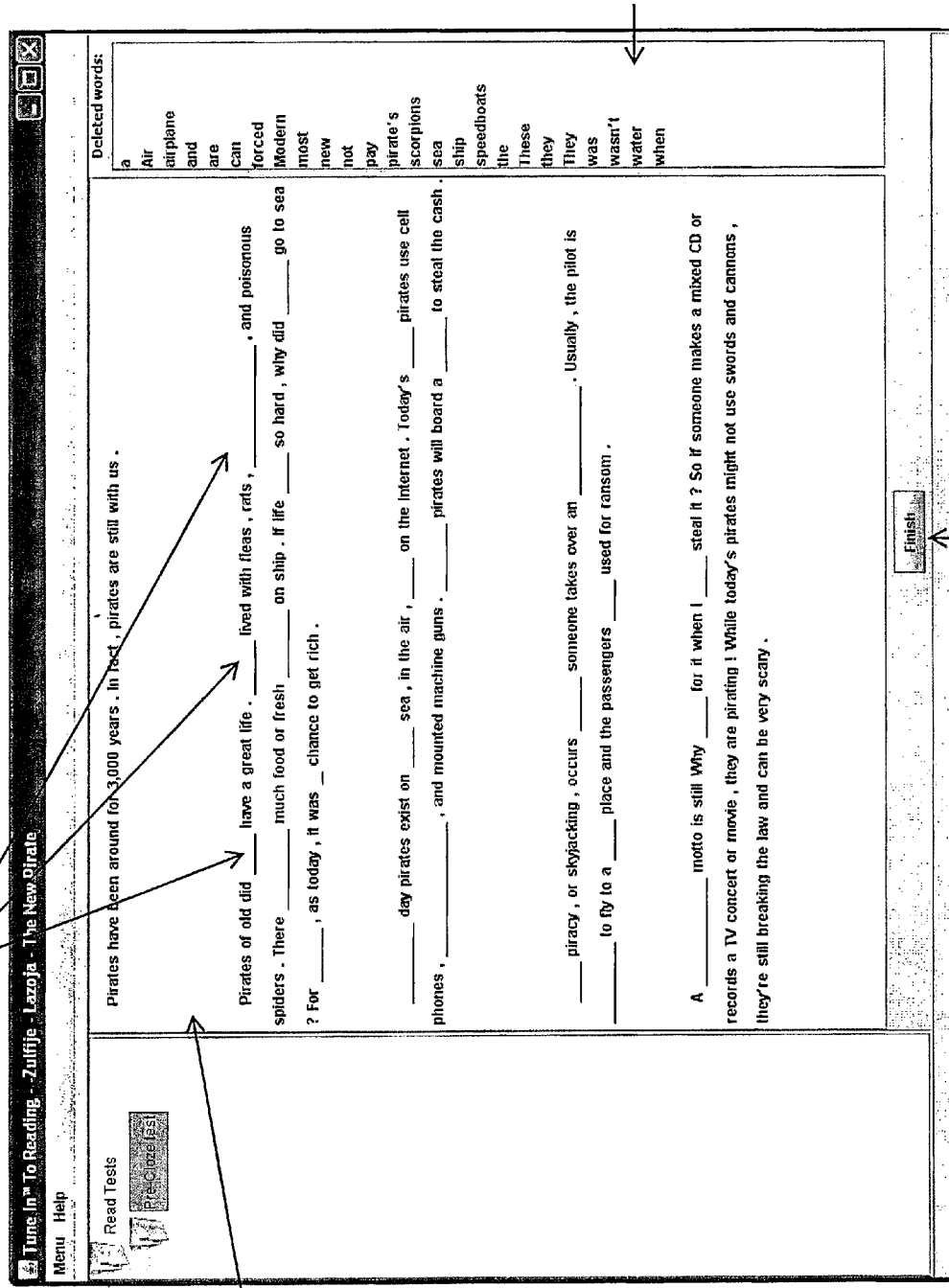
FIG. 10 depicts a Cloze-test as utilized in testing and exercising a student.

As is evident from FIG. 10, the present invention improves upon this Cloze testing approach by interactively presenting the student with the Cloze test. The student is presented with two separate boxes of information. As shown in prose box 101, the student is presented with a section of text, wherein twenty-five words have been omitted. These omitted words are indicated to the student by way of blanks 101*a*. In the deleted words box 102, the user is provided twenty-five words that have been removed from the prose displayed in the prose box 101.

The student then navigates through the text in prose box 101 by filling in the missing words. While it is obvious to one of ordinary skill in the art, preferably a student can utilize the tab key on his or her keyboard to move from one blank 101*a* to the next.

Once the student has completed the test, the student indicates he or she is finished by way of the button 103. This activity logs the students results for the teacher's review. Moreover, as discussed in detail below, the student's test results are utilized in determining which instructional reading level and which frustration reading level the student has achieved.

FIG. 10 describes the aspect of the invention for determining the student's instructional and frustration reading levels. Preferably, the invention is embodied in a computer program. This computer program can be run on a dedicated machine, or, more preferably, presented to a class of students (or entire school, county or other larger grouping) by way of a client-server implementation wherein the students interact with the system through clients which are interconnected to a server or servers practicing this invention. In one preferred embodiment, Sun Microsystem's Java Web Start technology is utilized as a platform for seamlessly and efficiently delivering applications embodying the present invention to the users. It is worth noting that the users include students, teachers, administrators and others who benefit from the teachings of the present invention.

FIG. 11 describes the process used in evaluating a student's reading levels. As can be seen at step 202, the student to be tested is currently in the sixth grade. As is readily known, and most unfortunate, this does not mean that the sixth grade student can read at the level of a sixth grader. In fact, at step 204, the student's teacher assesses the student at the fourth grade reading level. This assessment is a subjective determination made by the teacher, and serves as a baseline for entry into the logic described in the remainder of FIG. 11.

As shown at step 206, the student is then presented with a Cloze test at the fourth grade level.

As part of the configuration of the current invention, Cloze tests are prepared and classified into different reading levels. For instance, Cloze tests that are appropriate for first grade reading level are classified as such. At step 208, the student's test results are analyzed, as discussed in more detail below. If the test results are at a frustration level, the process moves to step 210, wherein the student is re-tested at the third grade level. Note, the student has been dropped down a grade as it has been determined that reading at the fourth grade level would not be beneficial to this student. Alternatively, as depicted at step 220, if the student was comfortable reading at the fourth grade level, the system of the present invention re-tests the student at the fifth grade level. This is done so that the student's frustration reading level may determined, as will be described in more detail below. Regardless of whether the test results at step 208 indicate that the student was at the frustration level or the independent or instruction level, the process continues.

FIG. 11A describes in more detail the methodology utilized in determining whether the student should be tested at a higher or lower grade level during the next iteration of the testing. When the student is tested, for example at step 206, a score is generated. This generated score is then compared to two thresholds, a high threshold 1110, and a low threshold 1112. While FIG. 11*a* depicts a chart utilizing percentages as the basis for a student's scores, it would be obvious to one skilled in the art that any means of comparing results would suffice.

If the student's score falls in the range 1106 below the low threshold 1112, the student is determined to be at the frustration level, and the next iteration of testing should be at a lower level.

If the student's score falls in the range 1104 between the low threshold 1112 and high threshold 1110, the student is determined to be at the instructional reading level. If this is the first time the student's score has been in the range between the low threshold 1112 and high threshold 1110, the system gives the student another chance, by advancing the student to the next highest reading level, to see if the student is also instructional at that level. If the student has already scored in this range 1104 on a lower reading level, there is no longer a need to test the student any further, as the student is determined to be at this instructional reading level.

For example, if the student is tested at the fourth grade instructional reading level and scores between the low threshold 1112 and high threshold 1110, indicating the student is instructional at the fourth grade, the student will be tested again, but this time at the fifth grade reading level. If the student's result from testing at the fifth grade level also falls between the low threshold 1112 and high threshold 1110, testing of the student is complete, as at this stage the student is determined to be at the fifth grade reading level.

Returning to FIG. 11A, if the student's score falls in the range 1102 above the high threshold 1110, the student is determined to be at the instructional reading level and should be tested again at a higher reading level.

Returning to FIG. 11, as can be seen at step 212, the student's results from the testing at the third grade level are once again analyzed. Again, if the student's results indicate he or she is frustrated, the grading will be reduced a level as shown in 214. Alternatively, if the student's scores indicate he or she is comfortable reading at the third grade level, the testing stops at the third grade level as indicated in 216. Similarly, as shown at 214a and 214b, a determination is made concerning the student's results from taking the second grade reading level test. If the test results are at the frustration level, as indicated in 214a, the system notes that the student is reading at the first grade level. On the other hand, if the student's results from taking the second grade reading level test at step 214 indicate that the student is at an independent or instructional level, then the student will be noted at being at the second grade level.

The flow chart under step 220 follows the same approach. Namely, analyzing the test results and then making a determination whether to advance the student or whether the student has reached his or her frustration level. This determination is made at step 222. As can be seen at step 224, it has been determined that advancing the student to the fifth grade level indicated the student was frustrated reading at the fifth grade level. Thus, the student was marked as a fourth grade reading level student. This was because, as shown in step 208, the student was comfortable reading at the fourth grade level. Thus, it would be proper for this student to practice, as described below, at this fourth grade reading level. Alternatively, if the student's scores at step 222 still indicate that he or she is at the instructional or independent level, the system will continue advancing the student to the next level in this case, the next level, the sixth grade reading level. As before, at step 228, the student's reading score from step 226 will be analyzed to determine if the student has hit his or her frustration level, as described at step 230.

The end result of the process depicted in the chart 200 is a determination of the reader's frustration reading level and independent or instructional reading level. This instructional reading level is the level that is used for providing material for the student to practice on so that he or she may improve his or her reading capabilities. Once these capabilities have been determined, the student follows a curriculum designed and tailored for students reading at the appropriate reading level. In other words, if the system determines that the student is reading at the instructional fourth grade level, then the student will be presented with a current curriculum appropriate for a fourth grade reader.

Figure 12:
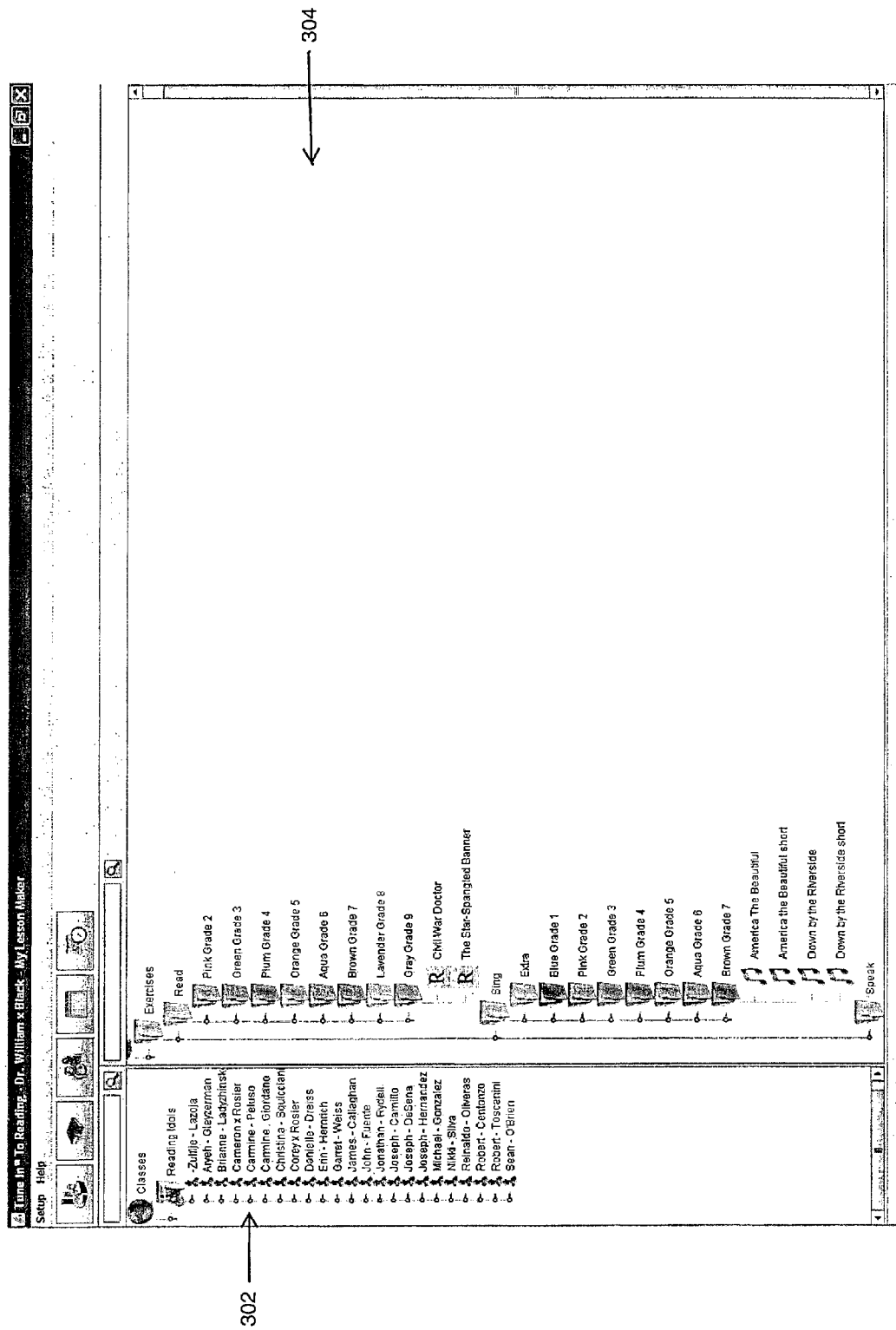
FIG. 12 illustrates the preferred layout of the "Lesson Maker" for teachers to utilize in preparing appropriate curricula.

The system is preconfigured with appropriate curricula for the various student skill levels. Teachers may also log into the system and assign appropriate singing, reading and speaking assignments to various grade categories as shown in FIG. 12. FIG. 12 depicts the Lesson Maker 300 utilized by teachers for preparing allocating assignments to students. As shown in box 302 on the left side, all of the teacher's classes are listed. In this case, the teacher who is logged into the lesson maker only has one class titled "Reading Idols". As can be seen below "Reading Idols" in 302, all of the students belonging to that class are listed.

On the right side of the Lesson Marker 300, in 304, the exercises that are available in this system are listed and available for the teacher to assign to particular students. Under "Exercises", there can be numerous categories. As shown in 304, there are three: "Read," "Sing" and "Speak." Under each of these categories, there are classifications depending upon the appropriate grade level. Thus, reading exercises that are appropriate for a grade nine student would be classified under the "Read" and then "Gray Grade 9" folder. As can be seen in 304, "Civil War Doctor" and the "Star Spangled Banner" are reading exercises which are appropriate for a ninth grade reader. Similarly, four songs are listed under the "Grade 7" classification for singing exercises. These four songs are "America the Beautiful," "America the Beautiful Short," "Down by the Riverside" and "Down by the Riverside Short."

Using the Lesson Maker depicted in 300, the teacher selects appropriate exercises from the right side 304 and drags them to appropriate students on the left side 302. It is obvious to one of ordinary skill in the art that a teacher can select multiple exercises or multiple classifications and drag them into multiple students or even into the entire class "Reading Idols." Once the teacher has completed assigning a curriculum using the Lesson Maker 300, the students will then be able to improve their reading capabilities by signing and reading and speaking exercises at the appropriate level.

Using the present invention as described in the alternative embodiments above, the student will practice with the exercises that are deemed appropriate for that student's reading level. Thus, if the student is at the fourth grade reading level, the student will practice with songs and other exercises that are appropriate for a fourth grade reading level student. As has been proven with local students, students can experience significant increases in their reading capabilities utilizing the teachings of the present invention.

As alluded to above, there are numerous different types of exercises that can be presented to students to assist them in improving their reading capabilities, including singing, reading, and speaking. As is obvious to one skilled in the art, this list is merely exemplary. Singing exercises are as described above in significant detail. Students select songs from their assigned curriculum and sing them repeatedly. This has the effect of requiring students to read and re-read text, but in an entertaining fashion.

Reading exercises work in the same manner as the Cloze tests that are presented to the student in determining the student's instructional and frustration reading levels.

Speaking exercises provide the student with a selection of text for the user to read and speak. Additionally, the system of the present invention provides for playing the text to the student so that the student can hear how the text should properly be read. Furthermore, the student can control the speed at which the text is read to the student, without altering the pitch or pronunciation. This allows the student to control which areas of the text to focus on.

The student is also able to select a portion of the text to read back. In doing this, the system will audibly read to the user the user's selected text. Then, the user can speak the same selected text into a microphone or other audio input device connected to the system. Using speech recognition techniques, the system compares the student's spoken words against that of a native speaker acoustical model. The system then provides feedback to the student concerning how well the student spoke the selected text.

One way the system provides feedback to the students during speaking exercises is by highlighting parts of the text that the user had trouble speaking. For instance, if a student had problems with only the first letter of a word, only that first letter will be highlighted. Alternatively, if a student had difficulty with the entire word, the entire word will be brought to the user's attention. Similarly, if a user did not read a word or words, the system will call this to the reader's attention.

The system identifies the individual phonemes that comprise the letters of the mispronounced words. To assist the students and teachers, the system gathers and statistically analyzes and reports on the mispronounced phonemes. This enables students to understand more fully where they have having difficulties. Similarly, this enables teachers to better gauge the performance of his or her entire classroom. The system uses this information to provide a score. This enables the student to further monitor her progress by improving her score as she improves her reading.

The system also can be utilized to improve pronunciation. For instance, non-native English speakers can use this system to refine and improve their pronunciation so as to reduce and potentially eliminate any accents or other speech variations. For instance, offshore call centers may require their telephone representatives to qualify before putting them in contact with their customers. This qualification procedure could include utilizing the present invention so as to score an adequate score during these reading exercises.

The user is also able to store and playback her recorded speech. This allows users to hear how they sound when they are reading the passage they have been presented with.

Additionally, the present invention is beneficial in teaching a student foreign languages, as well as different dialects and accents. For instance, in one embodiment of the present invention, marketed under the name Tune In.™. To Mandarin ("TIM"), the pitch tracking line is used in assisting the student to learn the tonality of Mandarin in a visual fashion. As will be described below, TIM leverages the power of music to help English-speaking students master the tonality of spoken Mandarin. Through this approach, students are presented with classic songs of early childhood in China. This enables the student to not only learn the vocabulary of the foreign language, but also master the rhythm and tone of the language, in the same manner that native speakers learn. As would be obvious to one of ordinary skill, this approach can be used to teach any language, accent or dialect.

Figure 13:
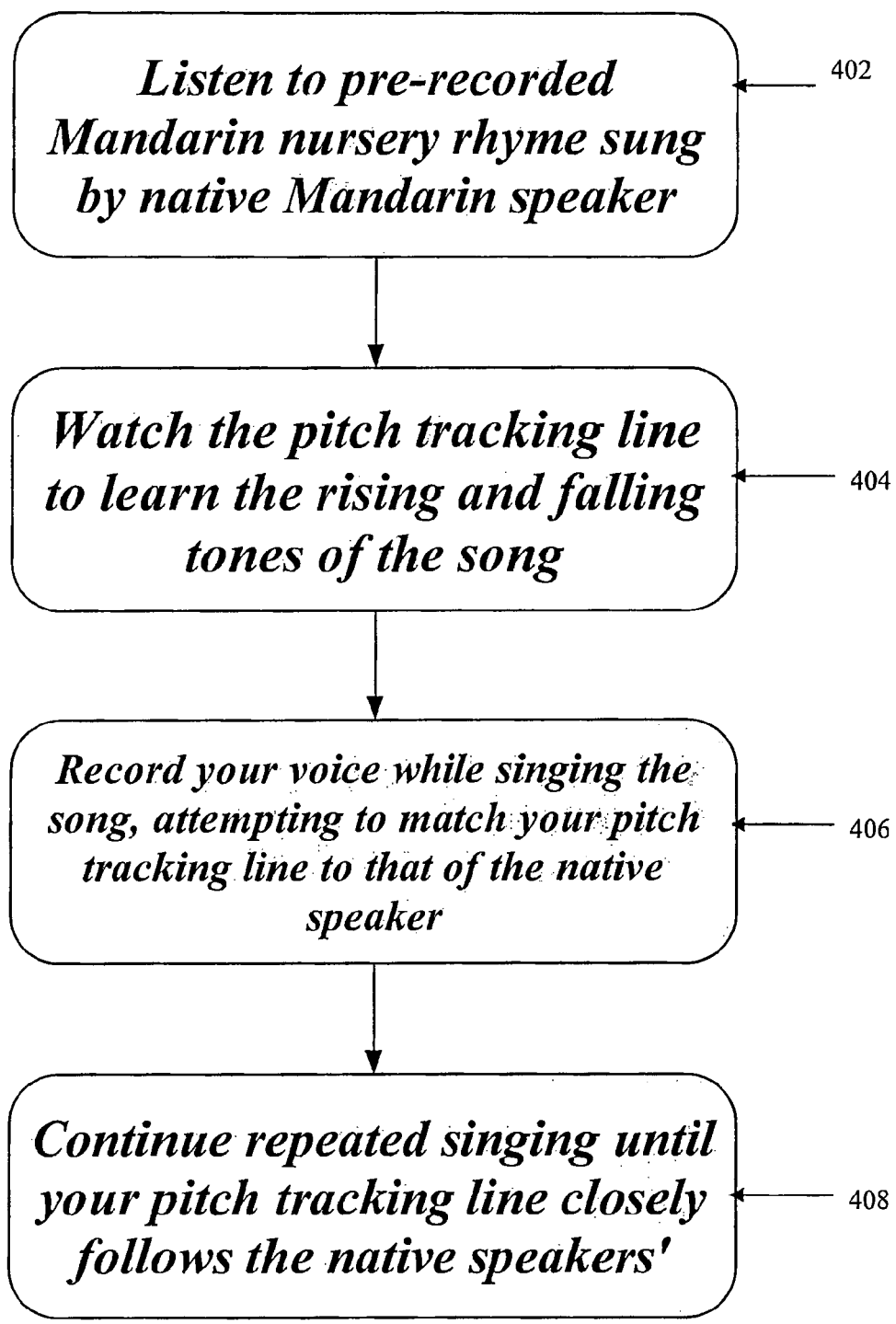
FIG. 13 is a flow chart illustrating the process methodology of the present invention in a preferred embodiment to teach non-Mandarin speakers how to speak Mandarin.
Figure 14:
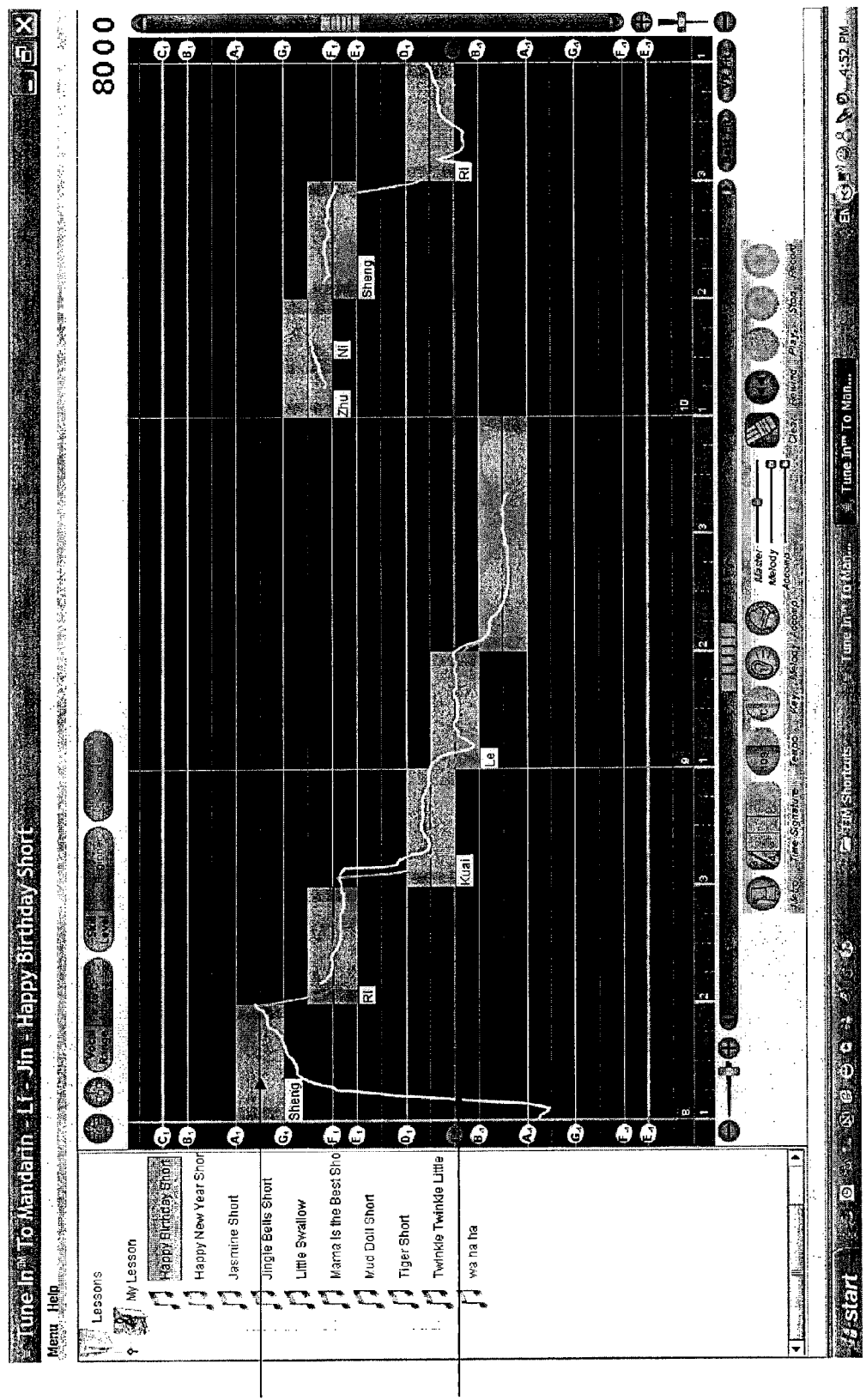
FIG. 14 illustrates the preferred layout of the "sing window" for displaying a the target pitch lines and boxes on the display when teaching Mandarin.

FIG. 13 provides a flow chart to assist in describing TIM. At step 402, the student is presented with a pre-recorded Mandarin nursery rhyme. This nursery rhyme is audibly provided to the student as sung by a native Mandarin speaker. Through step 402, the student is able to hear how the nursery rhyme should properly be sung and pronounced. As described at step 404, while the student is listening to the native speaker's singing of the nursery rhyme, the user also watches the pitch tracking line as described throughout this disclosure. The pitch tracking line in this situation is tracking the native Mandarin speaker's rendition of the Mandarin nursery rhyme. As shown in FIG. 14, the pitch tracking line 502 allows the user to follow the native speaker's singing visually.

At step 406, the student sings the Mandarin nursery rhyme. While doing so, a second pitch tracking line 504 is drawn on the display. Through this approach, the student attempts to match her own tracking line to that of the native Mandarin speaker's. Finally, as shown at step 408, the student continues singing until her pitch tracking line closely follows the tracking line established from the native Mandarin speaker.

Figure 15:
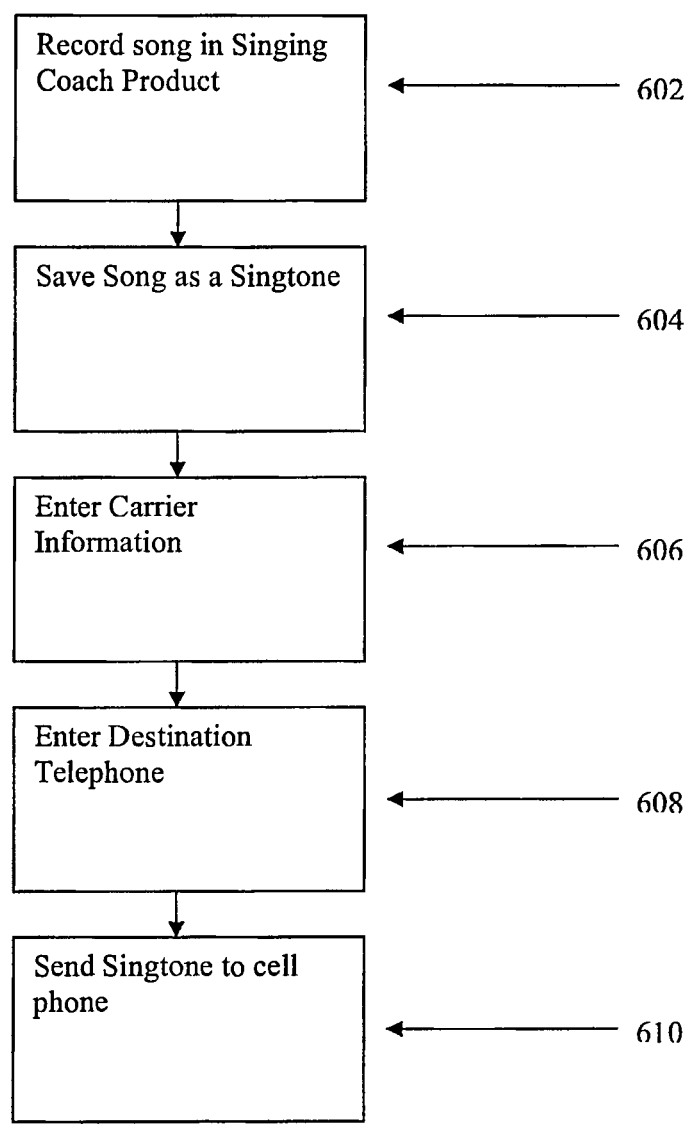
FIG. 15 is a flow chart illustrating the process methodology of the present invention in a preferred embodiment to record, store and send Singtones.

The present invention also provides a method for recording a user's personal "Singtone" as described in FIG. 15. As has become extraordinarily popular, the telephone ringer in cellular telephones and other portable communication devices has been replaced to a large degree with what are commonly known as ringtones. Generally, a ringtone is a sound made by a telephone to indicate an incoming call. Recently, the term has been used to describe customized sounds used in mobile communication devices. Typically, users download or pay a carrier or other provider for access to these customized ringtones. Through the present invention, however, users are able to record their own singing, and deliver that to their mobile telephones and other mobile communication devices.

FIG. 15 provides a flowchart explaining the creation and delivery of Singtones. At 602, the user first records a song that she would like to utilize as a Singtone. Next, at 604, the system saves the user's recording as an Singtone, capable of being delivered to and utilized on a mobile communications device. At 606 and 608, the user enters information sufficient to direct the Singtone to the appropriate mobile communications device, such as the user's mobile telephone. Finally, at 610, the Singtone is sent to the mobile communications device so that it may be used as a ringtone.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method of teaching reading comprising:
   determining a user's vocal range;
   displaying, by an application executing on a computing device, a singing exercise on a display, the singing exercise configured to allow a user to sing along as a song is played;
   displaying, by the application executing on the computing device, on the display, lyrics of the song as the song is played, thus allowing the user to read the lyrics as the user sings along to the song;
   monitoring, by the application executing on a computing device, an audio input as the song is played, wherein the audio input comprises a user reading along to text to be read;
   computing a pitch tracking indicator from the audio input;
   displaying the pitch tracking indicator on the display within a target pitch area whereby the target pitch area is transposed into a key corresponding to the user's vocal range;
   calculating, by the application executing on the computing device, a score representing how accurately the audio input matches the song;
   providing, by the application executing on the computing device, the score of how accurately the audio input matches the song; and
   displaying the text to be read positioned proximate to the target pitch area and wherein the target pitch indicator represents at least one tone of the text to be read, whereby visualization of the pitch tracking indicator and target pitch area provides a real-time visual feedback of the pitch of the user's voice relative to the text being read to aid the user to better learn the text.

* * * * *